(12) United States Patent
Hill et al.

(10) Patent No.: US 10,148,000 B2
(45) Date of Patent: Dec. 4, 2018

(54) COUPLING STRUCTURES FOR ELECTRONIC DEVICE HOUSINGS

(71) Applicant: Apple Inc., Cupertino, CA (US)

(72) Inventors: Matthew D. Hill, Cupertino, CA (US); Michael B. Wittenberg, Cupertino, CA (US); Shane Bustle, Cupertino, CA (US); Duy P. Le, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/233,891

(22) Filed: Aug. 10, 2016

(65) Prior Publication Data

US 2017/0069956 A1 Mar. 9, 2017

Related U.S. Application Data

(60) Provisional application No. 62/214,558, filed on Sep. 4, 2015.

(51) Int. Cl.

| | |
|---|---|
| *G06F 1/16* | (2006.01) |
| *H01Q 1/24* | (2006.01) |
| *H04M 1/02* | (2006.01) |
| *B29C 45/14* | (2006.01) |
| *B29L 31/34* | (2006.01) |
| *B29C 37/00* | (2006.01) |

(52) U.S. Cl.
CPC ....... *H01Q 1/243* (2013.01); *B29C 45/14311* (2013.01); *B29C 45/14467* (2013.01); *G06F 1/1626* (2013.01); *G06F 1/1633* (2013.01); *G06F 1/1656* (2013.01); *H04M 1/0249* (2013.01); *H04M 1/0283* (2013.01); *B29C 37/0082* (2013.01); *B29L 2031/34* (2013.01); *B29L 2031/3437* (2013.01); *G06F 2200/1633* (2013.01)

(58) Field of Classification Search
CPC .......... G06F 1/1656; G06F 2200/1633; H04M 1/0249; H04M 1/0283
See application file for complete search history.

(56) References Cited

U.S. PATENT DOCUMENTS

| | | | |
|---|---|---|---|
| 4,567,318 | A | 1/1986 | Shu |
| 6,532,152 | B1 | 3/2003 | White et al. |
| 6,625,394 | B2 | 9/2003 | Smith et al. |
| 7,377,767 | B2 | 5/2008 | Dubuis et al. |
| 7,684,178 | B2 | 3/2010 | Hsu et al. |

(Continued)

FOREIGN PATENT DOCUMENTS

| | | |
|---|---|---|
| CN | 202540623 | 11/2012 |
| EP | 1225652 | 7/2002 |
| EP | 2838157 | 2/2015 |

*Primary Examiner* — Adrian S Wilson
(74) *Attorney, Agent, or Firm* — Brownstein Hyatt Farber Schreck, LLP

(57) ABSTRACT

A housing for an electronic device is disclosed. The housing comprises a first component and a second component separated from the first component by a gap. The housing also includes a first molded element disposed at least partially within the gap and defining at least a portion of an interlock feature, and a second molded element disposed at least partially within the gap and mechanically engaging the interlock feature. The first component, the second component, and the second molded element form a portion of an exterior surface of the housing. A method of forming the housing is also disclosed.

22 Claims, 22 Drawing Sheets

(56) References Cited

U.S. PATENT DOCUMENTS

| | | |
|---|---|---|
| 7,713,054 B2 | 5/2010 | Mai |
| 7,798,804 B2 | 9/2010 | Kmoch et al. |
| 8,373,980 B2 | 2/2013 | Reber |
| 8,380,258 B2 | 2/2013 | Kim et al. |
| 8,506,327 B2 | 8/2013 | Jol |
| 8,537,543 B2 | 9/2013 | Wang et al. |
| 8,620,395 B2 | 12/2013 | Kang et al. |
| 8,654,029 B2 | 2/2014 | Fan et al. |
| 8,665,160 B2 | 3/2014 | Uttermann et al. |
| 8,773,847 B2 | 7/2014 | Byun et al. |
| 8,878,060 B2 | 11/2014 | Wright et al. |
| 8,884,826 B2 | 11/2014 | Wu et al. |
| 8,980,026 B2 | 3/2015 | Ely |
| 9,036,358 B2 | 5/2015 | Shoji et al. |
| 9,075,567 B2 | 7/2015 | Mathew et al. |
| 9,146,588 B2 | 9/2015 | Kole et al. |
| 9,223,349 B2 | 12/2015 | Franklin et al. |
| 9,229,675 B2 | 1/2016 | Beeze et al. |
| 9,282,657 B2 | 3/2016 | Miyaoka et al. |
| 9,338,909 B2 | 5/2016 | Tanaka |
| 9,360,889 B2 | 6/2016 | Idsinga et al. |
| 9,469,469 B2 | 10/2016 | Rayner |
| 9,516,150 B2 | 12/2016 | Jeon et al. |
| 9,520,638 B2 | 12/2016 | Baringer et al. |
| 9,578,145 B2 | 2/2017 | Chang |
| 9,591,110 B2 * | 3/2017 | Hill ............... H04M 1/0249 |
| 9,606,579 B2 | 3/2017 | Pakula et al. |
| 9,791,893 B2 | 10/2017 | Yamaguchi et al. |
| 9,795,044 B2 | 10/2017 | Lai et al. |
| 2008/0268083 A1 | 10/2008 | Ferenc |
| 2009/0141436 A1 * | 6/2009 | Matsuoka ............. G06F 1/1626 |
| | | 361/679.09 |
| 2010/0230155 A1 | 9/2010 | Hashizume et al. |
| 2012/0319907 A1 | 12/2012 | Wu et al. |
| 2013/0162124 A1 * | 6/2013 | Miyaoka ............. H05K 5/0217 |
| | | 312/223.1 |
| 2013/0165189 A1 * | 6/2013 | Shoji ................... G06F 1/16 |
| | | 455/575.1 |
| 2013/0235538 A1 | 9/2013 | Hashimoto et al. |
| 2013/0328462 A1 * | 12/2013 | Pakula ................. G06F 1/1626 |
| | | 312/223.1 |
| 2014/0004294 A1 * | 1/2014 | Christophy ............ B29C 39/10 |
| | | 428/101 |
| 2014/0023430 A1 * | 1/2014 | Prest ................. B29C 47/0019 |
| | | 403/265 |
| 2014/0092532 A1 * | 4/2014 | Kole ................... H04M 1/0249 |
| | | 361/679.01 |
| 2014/0206420 A1 | 7/2014 | Neichi |
| 2014/0334077 A1 | 11/2014 | Kwong |
| 2015/0062807 A1 * | 3/2015 | Gwin .................. G06F 1/1656 |
| | | 361/679.55 |
| 2015/0093527 A1 | 4/2015 | Montevirgen |
| 2017/0094811 A1 | 3/2017 | Shi et al. |
| 2017/0205847 A1 | 7/2017 | Wagman et al. |
| 2017/0279943 A1 * | 9/2017 | Hill ................... H04M 1/0249 |

* cited by examiner

COUPLING STRUCTURES FOR ELECTRONIC DEVICE HOUSINGS

CROSS-REFERENCE TO RELATED APPLICATION

This application is a nonprovisional patent application of and claims the benefit of U.S. Provisional Patent Application No. 62/214,558, filed Sep. 4, 2015 and titled "Coupling Structures for Electronic Device Housings," the disclosure of which is hereby incorporated herein by reference in its entirety.

FIELD

The subject matter of this disclosure relates generally to coupling structures for electronic device housings, and more particularly to coupling structures for joining housing components with molded polymer materials.

BACKGROUND

Electronic device housings often include multiple components that are coupled together to form the housing. For example, two or more housing portions may be coupled together to form an outer surface of the housing and to form an interior cavity in which components of the electronic device are housed. For different materials and more complex geometries, existing techniques for coupling housing portions may not be suitable for creating bonds of sufficient strength between components, and may not be capable of producing a surface finish and appearance necessary for exterior surfaces of an electronic device housing.

SUMMARY

Described herein are structures for coupling housing components of electronic device housings. For example, as described herein, a polymer material may be molded or otherwise disposed between two or more housing components to form a molded polymer element that couples the housing components together. The housing components may include various interlock features that mechanically engage with the molded element in order to form a secure coupling between the housing components and the molded element. The molded element may include portions made of different materials to benefit from the properties of each different material. For example, a first polymer material having a high strength may be used to form one portion of the molded element, while a second polymer material that is more easily polished or that forms a smoother outer surface may be used for a portion of the molded element that forms part of an exterior surface of the housing.

Some embodiments provide a housing for an electronic device. The housing includes a first component and a second component separated from the first component by a gap. The housing also includes a first molded element disposed at least partially within the gap and defining at least a portion of an interlock feature, and a second molded element disposed at least partially within the gap and mechanically engaging the interlock feature. The first component, the second component, and the second molded element form a portion of an exterior surface of the housing.

Some embodiments provide a housing for an electronic device. The housing includes a first component, a second component separated from the first component by a gap, and a joint structure disposed at least partially within the gap. The first component and the second component comprise flanges defining first and second portions, respectively, of a frame adapted to receive a transparent cover. A tooth of the joint structure extends past a ledge of the joint structure and forms a third portion of the frame. The joint structure includes a support structure that supports the tooth.

Some embodiments provide a housing for an electronic device. The housing includes a first housing portion forming a first portion of an exterior surface of the housing, and a second housing portion separated from the first housing portion by a gap and forming a second portion of an exterior surface of the housing. The housing further includes a molded element disposed in the gap and comprising a guide structure configured to bias at least a portion of the molded element toward an interior of the housing in response to a narrowing of the gap.

Some embodiments provide a method of forming a housing for an electronic device. The method includes forming a first molded element by flowing a material into a gap between a first housing component and a second housing component, flowing the material against a first interlock feature of the first housing component to couple the material to the first housing component, and flowing the material against a second interlock feature of the second housing component to couple the material to the second housing component. The method further includes forming a second molded element in the gap to form an exterior surface of the electronic device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
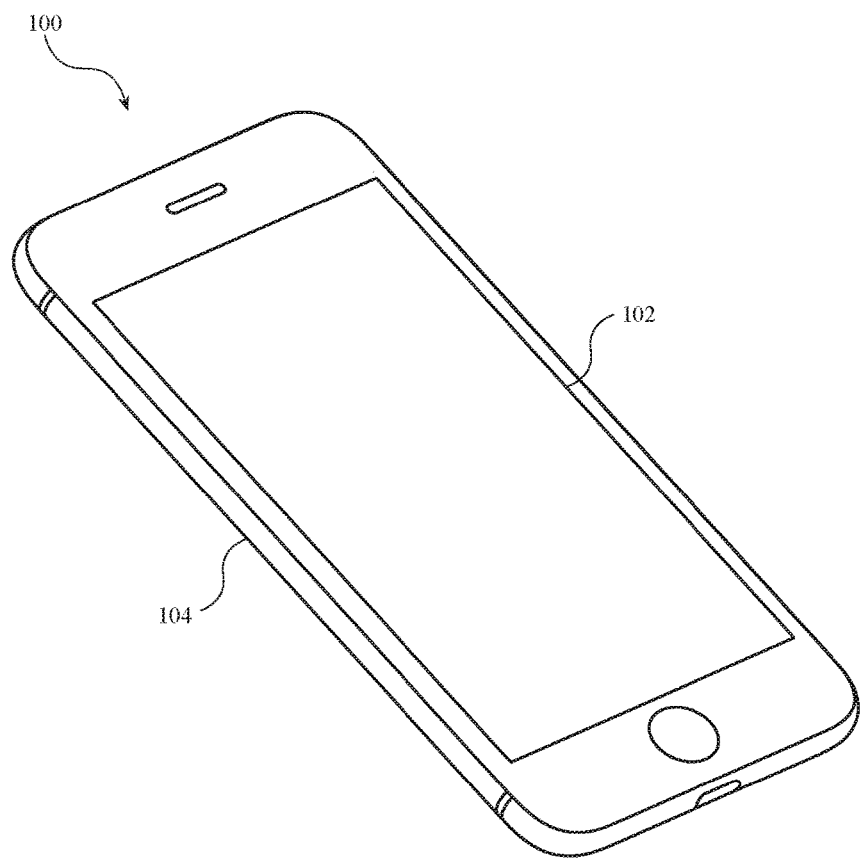
FIG. 1 shows an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Housings for electronic devices may be made up of multiple different components. For example, a housing may include a first component that forms a back surface of the housing, a second component that forms a side or edge of the housing, and so on. In order to join the first and second components (for example), a polymer material (or other suitable material) may be molded in or into a gap between the components. In order to produce a suitably strong coupling between the components, the first and second housing components include interlock features with which the polymer material engages. The polymer material may be molded into the gap in a viscous or flowable state such that it flows into, surrounds, and/or otherwise engages the interlock features of the housing components. Once the polymer material hardens, the engagement between the polymer material and the interlocks securely couples the housing portions together. An interlock (or interlock feature) is a structure or feature that engages another structure or feature to retain a component to one or more other components. Interlocks may include, for example, threads (e.g., threaded posts, holes, or other surfaces), undercuts, dovetails, grooves, protrusions, notches, channels, or the like.

The gaps between housing components may be configured such that the material within the gap forms part of the exterior surface. For example, joint structures may be disposed in gaps between housing components, and may be part of the exterior surface of the housing. In some cases, a material that is suitable for structurally joining housing components is not ideal for forming an exterior surface of the housing, and vice versa. As one non-limiting example, whereas strength and rigidity may be important properties for a joining material, surface finish and chemical resistance may be equally or more important for a material that will form part of an exterior surface of the housing. Accordingly, multiple materials may be molded into a gap, and each material may be selected to satisfy a particular design constraint or requirement. For example, a first material may be molded into the gap to structurally couple the housing components. A second material may then be molded into the gap, over the first material, to form part of an exterior surface of the housing. By using multiple materials in a gap, the materials can each be optimized for specific purposes and/or characteristics.

In the following figures and description, similar instances of particular components or features may be designated by additional indicators appended to the element number. For example, particular instances of first molded elements may be designated 400-1, 400-2, etc. References to an element number without any additional indicator (e.g., the first molded elements 400) apply to any or all instances of that component or feature, and references to an element number with an additional indicator (e.g., the first molded element 400-1) apply to a particular instance of that component or feature. Moreover, any discussion related to an individual instance of a component or feature (e.g., the first molded element 400-1) may also apply to other instances of that component (e.g., the first molded element 400-2).

FIG. 1 shows an example electronic device 100 embodied as a smartphone. While the device 100 is a smartphone, the concepts presented herein may apply to any appropriate electronic, including wearable devices (e.g., watches), laptop computers, handheld gaming devices, tablet computers, computing peripherals (e.g., mice, touchpads, keyboards), or any other device. Accordingly, any reference to an "electronic device" encompasses any and all of the foregoing.

Figure 2:
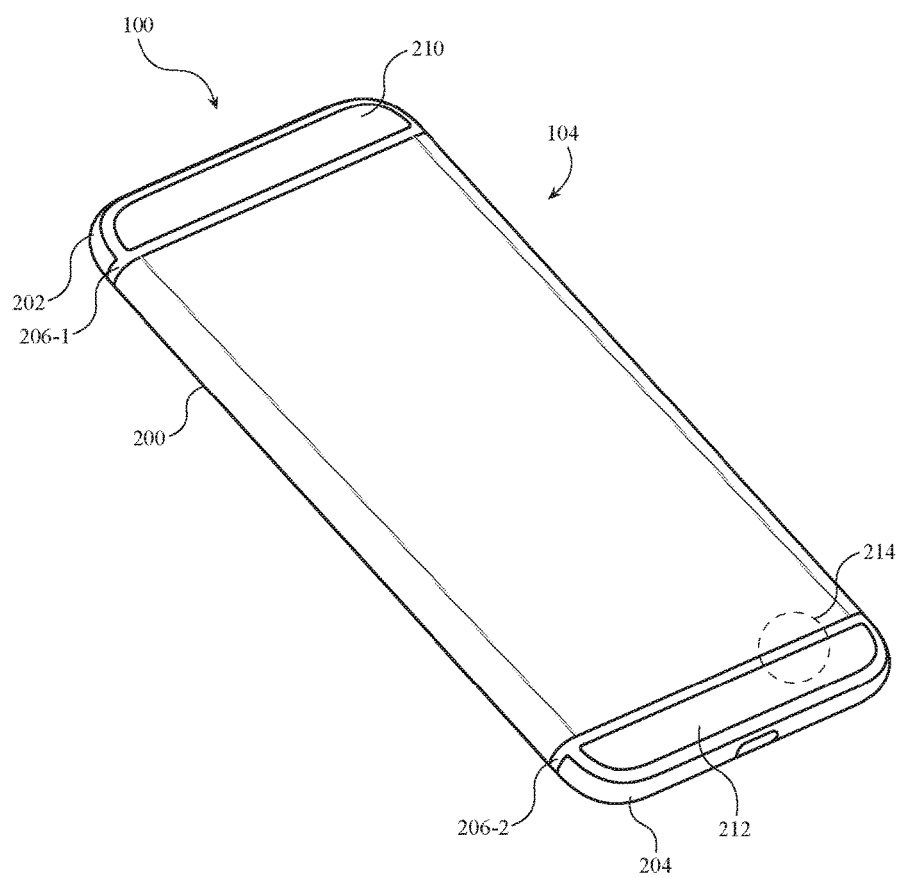
FIG. 2 shows a back of the example electronic device of FIG. 1.

The electronic device includes a cover 102, such as a glass, plastic, or other substantially transparent material, component, or assembly, attached to a housing 104. As shown, the housing 104 can be a multi-piece housing. For example, the housing 104 can be formed from a body portion 200 and end portions 202, 204 (FIG. 2). The device 100 also includes internal components, such as processors, memory, circuit boards, batteries, sensors, and the like. Such components, which are not shown, may be disposed within an interior volume defined at least partially by the housing 104.

FIG. 2 shows a back view of the device 100. The housing 104 includes a body portion 200 and end portions 202, 204 (also referred to herein as a top portion 202 and a bottom portion 204). The body portion 200 and the end portions 202, 204 may be formed from any appropriate material, such as aluminum, titanium, amorphous metals, polymer, or the like.

The housing 104 also includes a joint structure 206-1 between the body portion 200 and the top portion 202, and a joint structure 206-2 between the body portion 200 and the bottom portion 204. Joint structures are structures that couple and/or retain one component to another component. For example, the joint structures 206 couple the end portions 202, 204 to the body portion 200, as described herein. The joint structures 206 may include multiple layers and/or portions, each of which may be formed from any appropriate material. For example, joint structures or portions thereof may be formed from polymers such as nylon, polyether ether ketone, polysulfone, polyphenylsulfone, polyaryletherketone, polyetherimide, polyethersulfone, or any other appropriate material. Moreover, the joint structures 206 may be reinforced with reinforcing fibers of glass, carbon, ceramics, or any other appropriate material.

Figure 3:
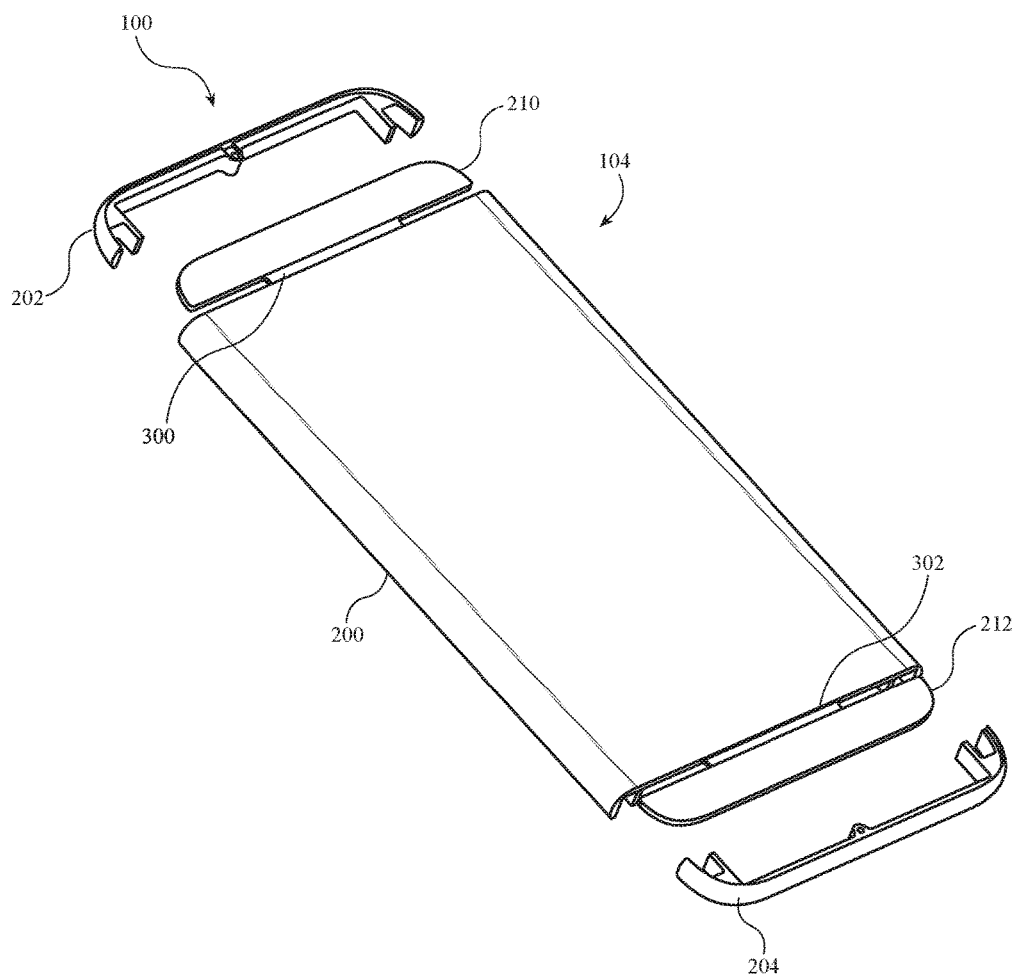
FIG. 3 shows an exploded view of an example electronic device housing.

The housing 104 also includes a first panel 210 and a second panel 212. As shown in FIG. 3, the first and second panels 210, 212 are part of the body portion 200 (e.g., the first and second panels 210, 212 and the body portion 200 are a monolithic structure). For example, as shown in FIG. 3, bridge portions 300, 302 join the first and second panels 210, 212, respectively, to the body portion 200. Alternatively, the first and second panels 210, 212 may be separate from the body portion 200. In such cases, the joint structures 206 may couple the panels 210, 212 to the body portion 200.

Returning to FIG. 2, exterior surfaces of the joint structures 206 may form a continuous surface with exterior surfaces of the housing 104. Alternatively, the exterior surfaces of the joint structures 206 may be recessed from or proud of portions of the housing that are adjacent the joint structures 206. Further, the exterior surfaces of the joint structures 206 may be configured to blend in with other portions of the housing 104. For example, the joint structures 206 may be the same color as nearby portions of the housing 104, may have the same surface finish/texture as exterior portions of the housing 104, or the like. The joint structures 206 may also be formed from the same material as the body portion 200 and the end portions 202, 204. In some cases, however, the joint structures 206 have a different color or surface finish than exterior portions of the housing 104.

The body portion 200 and/or the end portions 202, 204 may be part of an electrical circuit of the device 100. For example, one or both of the end portions 202, 204 may be an antenna, or a portion of an antenna, for wireless communication (e.g., cellular, Wi-Fi, Bluetooth, and so on). Where an end portion is an antenna, or is otherwise part of an electrical circuit, it may be necessary or desirable to electrically and/or capacitively isolate one or both of the end portions from other portions of the housing 104, such as the body portion 200. Accordingly, the joint structures 206 may be formed from an electrical insulator that electrically and/or capacitively isolates and/or insulates the housing components from each other while also coupling them together to form a structurally sound housing 104.

FIG. 3 shows a partial exploded view of the housing 104, with the end portions 202, 204 separated from the body portion 200. As described herein, the joint structures 206 (shown in FIG. 2, not shown in FIG. 3) couple the end portions 202, 204 to the body portion 200. Also shown in FIG. 3 are bridge portions 300, 302 that join the first and second panels 210, 212, respectively, to the body portion 200. The bridge portions 300, 302 are recessed relative to an exterior surface of the body portion 200, forming grooves in the body portion 200 that receive portions of the joint structures (e.g., the second molded elements 600, FIG. 6).

Figure 4:
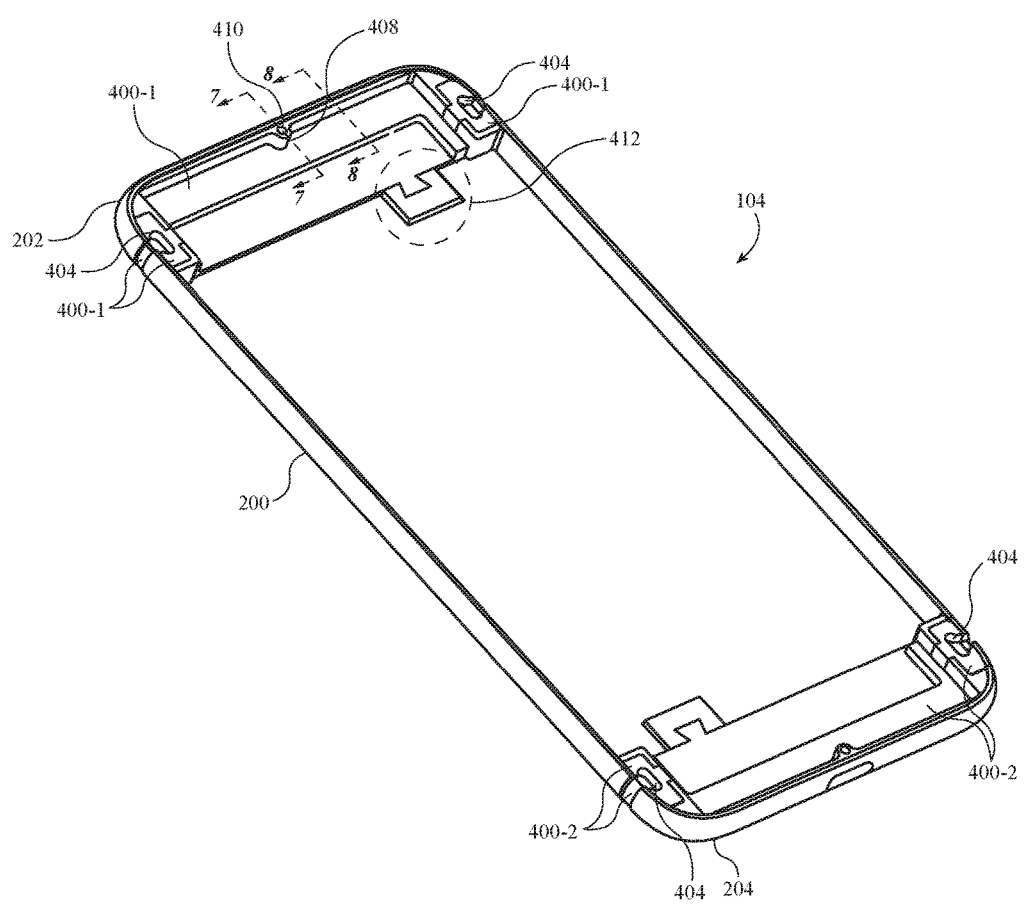
FIG. 4 shows a portion of an example electronic device housing.
Figure 5:
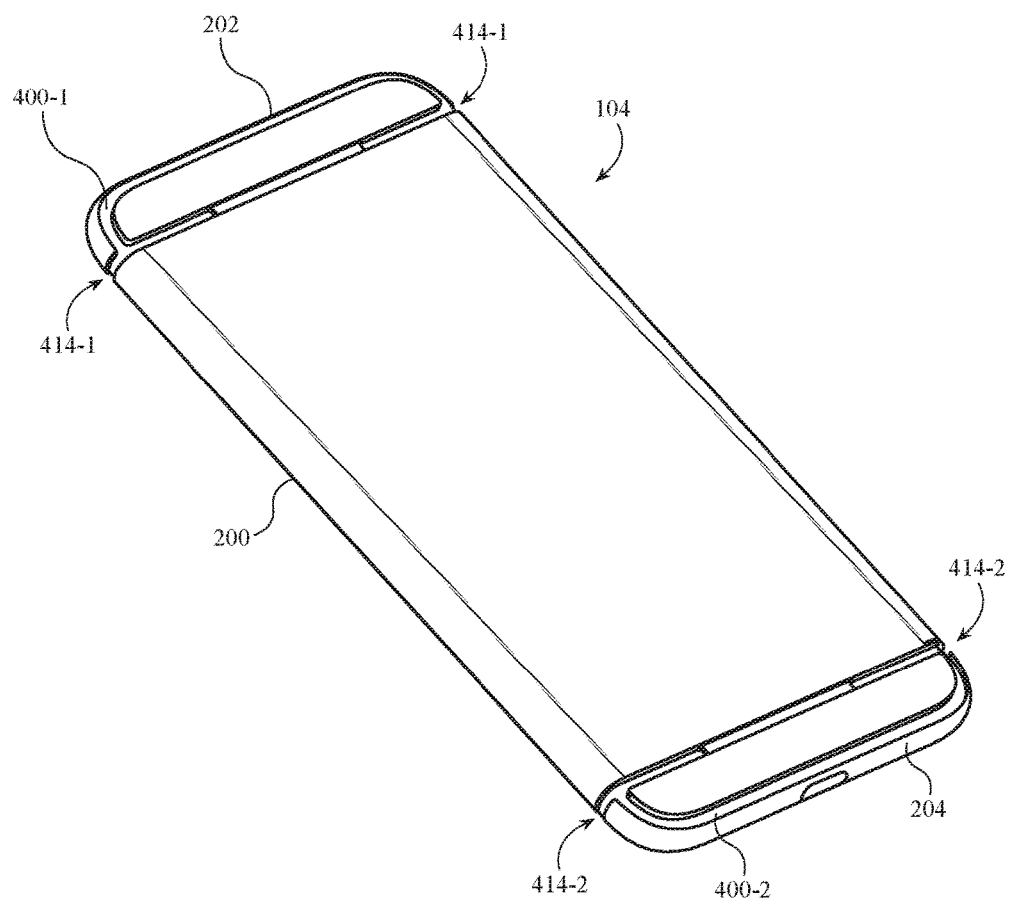
FIG. 5 shows a back of the electronic device housing of FIG. 4.
Figure 6:
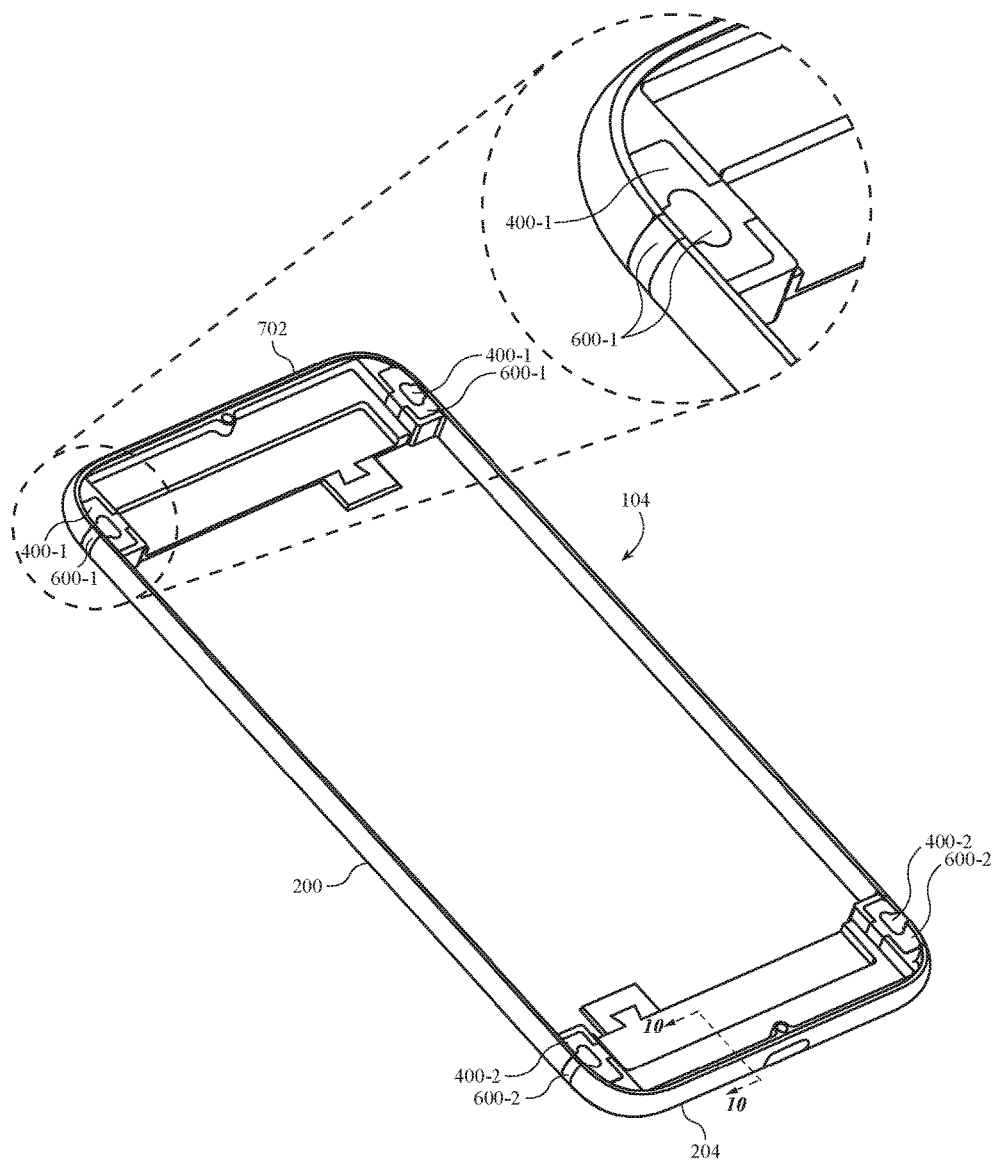
FIG. 6 shows the electronic device housing of FIG. 4.

FIGS. 4-6 show various views of an embodiment of the housing 104 in which the joint structures 206 each include two molded elements. For example, with reference to FIGS. 4-5, first molded elements 400 (e.g., 400-1 and 400-2) are disposed at least partially within gaps between the top and bottom portions 202, 204 and the body portion 200, and couple the top and bottom portions 202, 204 to the body portion 200. The molded elements described herein may be formed by molding (including, for example, injecting) a material into the gaps between components of the housing 104. However, the molded elements, or portions thereof, may be formed in other ways as well, and are not necessarily limited to any particular manufacturing or forming process. For example, one or more of the molded elements may be formed separately from the housing 104 (using any appropriate process, such as extruding, machining, or the like) and positioned in the gaps after the molded elements are formed.

As shown in FIGS. 4 and 5, the first molded elements 400 do not extend to the exterior surfaces of the housing 104. Rather, the first molded elements 400 only partially fill the gaps between the housing portions, leaving recesses 414 (e.g., 414-1 and 414-2, FIG. 5) into which second molded elements 600 (e.g., 600-1 and 600-2, FIG. 6) are then formed, filling the remaining portions of the gaps and forming part of the exterior surface of the housing 104. FIGS. 4-5 show the housing 104 with only the first molded elements 400 disposed in the gaps between the housing portions. FIG. 6 shows the front of the housing 104 with both the first molded elements 400 and the second molded elements 600 formed in the gaps.

The first molded elements 400 may couple the housing portions together by mechanically engaging with interlock features of the housing portions, as described herein. The second molded elements 600 couple to the housing 104 (and/or to the first molded elements 400) by mechanically engaging with interlock features of the housing 104 and/or the first molded elements 400, as discussed herein.

While the molded elements are described herein as being formed in or within the gaps between housing components, the molded elements may extend beyond the gaps and may couple to, cover, lie flush with, or otherwise engage with other portions of the housing 104. For example, as illustrated in FIG. 4, the first molded elements 400 include portions that cover part of an interior surface of the housing 104. Thus, some portions of the molded elements may be disposed within gaps between housing components, whereas other portions are disposed outside the gaps. Moreover, the molded elements of each joint structure 206 are shown and described as being single, monolithic components. More molded elements (e.g., several discrete molded elements) may be used to form any joint structure 206, however.

As noted above, the first and second molded elements may each benefit from, or otherwise employ, a different set of material properties. For example, the first molded elements 400 may provide the primary (or sole) mechanical coupling between housing portions. Accordingly, a material having a high yield strength, stiffness, and/or toughness (as compared to the material for the second molded elements 600, or even the housing 104, for example) may be selected to create the first molded elements 400. Additionally, the housing 104 may be subjected to certain processing steps after the housing portions are joined by the first molded elements 400, such as anodizing, annealing, or the like. In such cases, a material that is able to resist degradation or damage when subjected to anodizing, heating, or other chemical or physical processes may be selected for the first molded elements 400. For example, the first molded elements 400 may be formed from glass fiber reinforced nylon, glass fiber reinforced polyether ether ketone, or the like.

Different material properties may be useful for the second molded elements 600. For example, because the second molded elements 600 form part of the exterior surface of the housing 104, a material having a high chemical resistance may be selected, so that the material does not degrade when it comes into contact with potentially corrosive materials such as cleaning agents, sweat, water, alcohol, or the like. If the housing 104 is to be processed after the second molded elements 600 are formed, a material that can withstand anodizing processes, heating, or polishing may be selected. For example, after the housing 104 is formed, including forming both the first and second molded elements 400, 600, the exterior surface of the housing 104 may be polished. Thus, the second molded elements 600 typically withstand such a polishing process and also take on a smooth, polished surface itself.

The material may also be selected based on its ability to be pigmented or dyed to certain colors. For example, a dark material may not be able to be colored to a shade of white, which may be desirable for some housings. Also, because the second molded elements 600 form cosmetic surfaces of the housing 104, it may be preferable for the material to dent or deform slightly, rather than crack or shatter, when the device 100 is dropped or otherwise subjected to a potentially damaging force. Thus, a material that is not prone to brittle failure may be selected for the second molded elements 600. Non-limiting examples of materials that may be used to form the second molded elements 600 include polyether ether ketone, polysulfone, polyphenylsulfone, polyaryletherketone, polyetherimide, and polyethersulfone.

Figure 7:
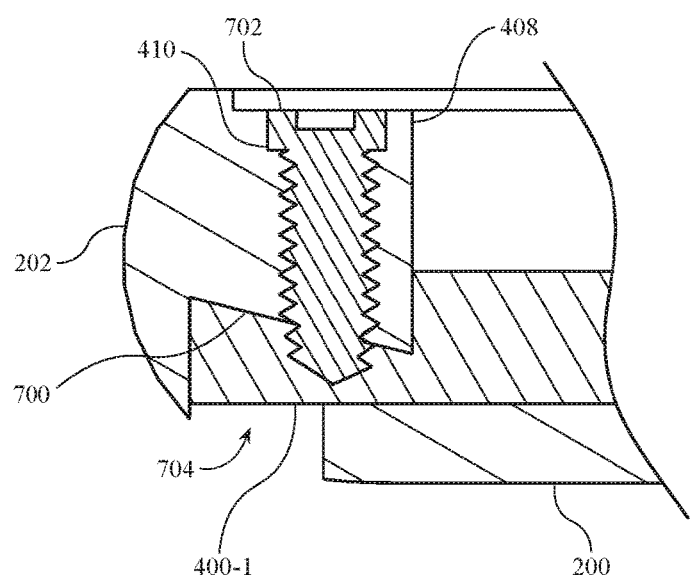
FIG. 7 shows a partial cross-sectional view of the electronic device housing of FIG. 4 taken along line 7-7 in FIG. 4.

FIG. 7 is a partial cross-sectional view of the housing 104 taken along line 7-7 in FIG. 4, illustrating how a boss 408 mechanically engages the first molded element 400-1 to couple the top portion 202 to the first molded element 400-1. The mechanical engagement between the boss 408 (and/or a screw 702 held by the boss) and the first molded element 400-1 couples the top portion 202 to the first molded element 400-1. Because the first molded element 400-1 is also coupled to the body portion via other interlock features, as described herein, the engagement between the boss 408 and the first molded element 400-1 results in the top portion 202 being coupled to the body portion 200.

A recess 704 receives the second molded element (not shown) that forms a portion of the exterior surface of the housing 104. The first molded element 400-1, as molded, may form a bottom surface of the recess 704 (e.g., the first molded element 400-1 is molded to its final shape, which at least partially defines the recess, in a single molding or forming process). Alternatively, the first molded element 400-1 may be processed after molding to form the recess 704. For example, after material is introduced into the gap to form the molded element 400-1, the material may partially or completely occupy the recess 704, and subsequent processing (e.g., grinding, milling, laser ablation, and the like) may be used to remove material from the first molded element 400-1 to form the recess 704.

The boss 408 includes an angled surface 700 that forms an undercut engaging the first molded element 400-1. In particular, when the material forming the first molded element 400-1 is molded into the gap between the top portion 202 and the body portion 200, the material flows into the space under the angled surface 700. Once the material hardens, the angled surface 700 prevents the first molded element 400-1 from horizontally separating from the top portion 202 (with respect to the orientation shown in FIG. 7). Other interlock features and/or structural components may prevent the first molded element 400-1 and the top portion 202 from moving vertically relative one another, increasing the effectiveness of the angled surface 700 in retaining the first molded element 400-1 and the top portion 202. For example, threads of the screw 702 (described herein) may prevent the top portion 202 from moving vertically relative to the first molded element 400-1 (with respect to the orientation shown in FIG. 7).

As noted above, a screw 702 may be threaded into or otherwise secured in a through-hole 410 of the boss 408. The screw 702 extends below the angled surface 700 and into the first molded element 400-1, thus acting as an interlock feature to prevent the first molded element 400-1 and the top portion 202 from moving horizontally (and vertically) with respect to one another. While FIG. 7 depicts a screw, similar functionality may be provided by a smooth post, a splined post, or any other appropriate feature that extends below the angled surface 700 and engages the first molded element 400-1.

The boss 408 need not include both the angled surface 700 and the screw 702. For example, the boss 408 may have a horizontal surface in place of the angled surface 700 (or a surface angled in an opposite or another direction than the angled surface 700). In such embodiments, the boss 408 may provide mechanical engagement between the top portion 202 and the first molded element 400-1 by the screw 702 alone. Alternatively, the boss 408 may omit the through-hole 410 and the screw 702 entirely, and mechanically engage with the first molded element 400-1 solely with the angled surface 700 or with any other appropriate shape or feature.

In addition to forming an interlock feature that mechanically engages the first molded element 400-1, the boss 408 and/or the screw 702 may act as an electrical contact point to couple the top portion 202 to an electrical component of the device 100. For example, where the top portion 202 is an antenna (or part of an antenna), an electrical connector that is electrically coupled to a radio circuit or component may be coupled to the boss 408 by the screw 702. Thus, the top portion 202 may be electrically coupled to the radio circuit or component. The bottom portion 204 may include a similar boss to electrically couple the bottom portion 204 to electrical components of the device 100.

Figure 8:
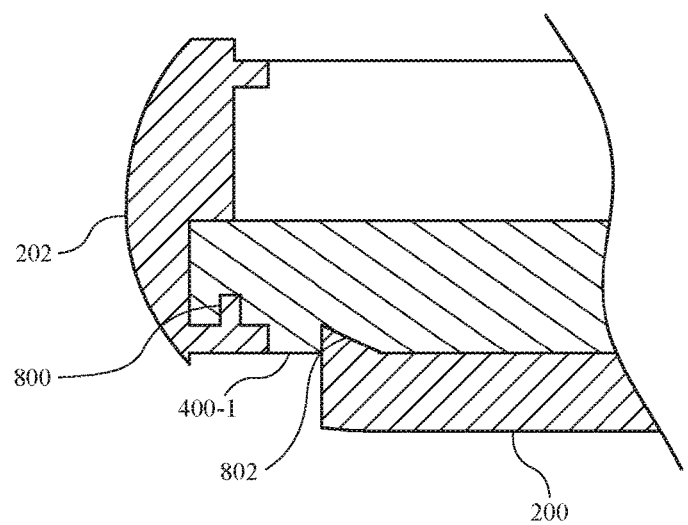
FIG. 8 shows a partial cross-sectional view of the electronic device housing of FIG. 4 taken along line 8-8 in FIG. 4.

FIG. 8 is a partial cross-sectional view of the housing 104 taken along line 8-8 in FIG. 4, illustrating various interlock features that may couple the top portion 202 and/or the body portion 200 to the first molded element 400-1. The top portion 202 includes a post 800 that extends vertically from a surface. During forming of the first molded element 400-1, the material of the first molded element 400-1 flows around the post 800. When the material hardens, the first molded element 400-1 at least partially surrounds the post 800, and the first molded element 400-1 is thus prevented from moving horizontally with respect to the top portion 202 (as oriented in FIG. 8).

The post 800 may have any appropriate shape and/or cross-section. For example, the post 800 may have a circular (e.g., a cylindrical post), square, rectangular, or triangular cross-section, or any other appropriate cross-section. Moreover, the post (and/or any associated supporting structures) may be formed in any appropriate way. For example, the top portion 202 may include the post 800 as-cast or as-molded. More particularly, a mold that is used to form the top portion 202 may be configured to produce a net (or near-net) shape top portion 202 that includes the post 800. As another example, the post 800 may be machined into the top portion 202. As yet another example, the post 800 may be formed by laser sintering material onto the top portion 202 to form the post 800 (e.g., using a laser to sinter powdered material that is built-up on a surface) or bonding a post to the top portion 202. As yet another example, the post 800 may be a separate component that is screwed, threaded, or otherwise attached to the top portion 202.

Like the top portion 202, the body portion 200 may also include an interlock feature that engages the first molded element 400-1. For example, the body portion 200 may include an angled protrusion 802 that extends away from a surface of the body portion 200 and engages the first molded element 400-1. (Instead of or in addition to the angled protrusion 802, the body portion 200 may include any other protrusion or interlock feature, such as a post, a cavity, a screw, or the like.) The mechanical engagement between the angled protrusion 802 and the first molded element 400-1 prevents or limits the first molded element 400-1 from moving horizontally relative to the body portion 200. The angled protrusion 802 may be formed in any appropriate manner, such as molding, machining, laser sintering, bonding (e.g., adhering an additional component to the body portion 200) or the like.

Figure 9:
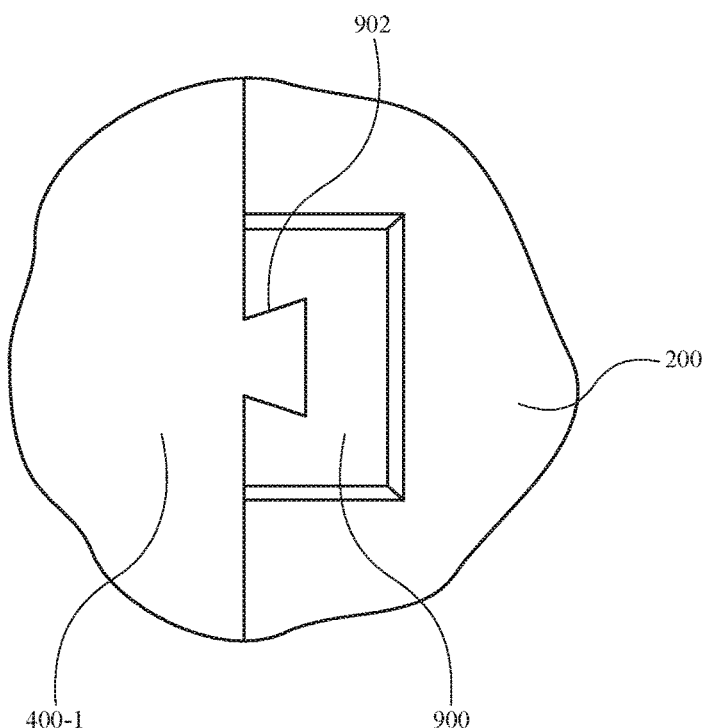
FIG. 9 shows an expanded view of a portion of the electronic device housing shown in region 415 of FIG. 4.

FIG. 9 is an expanded view of area 412 of FIG. 4, illustrating a dovetail-type interlock feature that couples the first molded element 400-1 to the body portion 200. The body portion 200 of the housing includes a dovetail-shaped recess 900. When the material of the first molded element 400-1 is introduced into the gaps, the material may also be introduced into the dovetail-shaped recess 900. Once the material is cured, the first molded element 400-1 forms a dovetail 902 that is disposed in the recess 900, and mechanically couples the first molded element 400-1 to the body portion 200.

FIGS. 7-9 illustrate interlock features that may be used to couple both the top portion 202 and the body portion 200 to the first molded element 400-1. Thus, the first molded element 400-1 effectively couples the top portion 202 to the body portion 200 to form the housing 104. The same or similar interlocks may be used to couple the bottom portion 204 to the body portion 200 using the first molded element 400-2 of the joint structure 206-2.

As noted above, the second molded elements 600 are formed in the recesses 414 and are coupled to the first molded elements 400 and/or portions of the housing 104. For example, the second molded elements 600 may mechanically engage interlock features of the first molded elements 400 or the housing 104. FIGS. 4 and 6 illustrate one example interlock feature that may be used to couple the first and second molded elements. In particular, the first molded elements 400 may include cavities 404 (FIG. 4) into which the second molded elements 600 may be formed. The cavities 404 communicate with the recesses 414 via an opening that is narrower (or otherwise smaller) than the cavity. Portions of the second molded elements 600 that are formed in the cavities 404 are thus held captive in the cavities 404, preventing the second molded elements 600 from decoupling or being pulled away from the first molded elements 400 and the housing 104.

Figure 10:
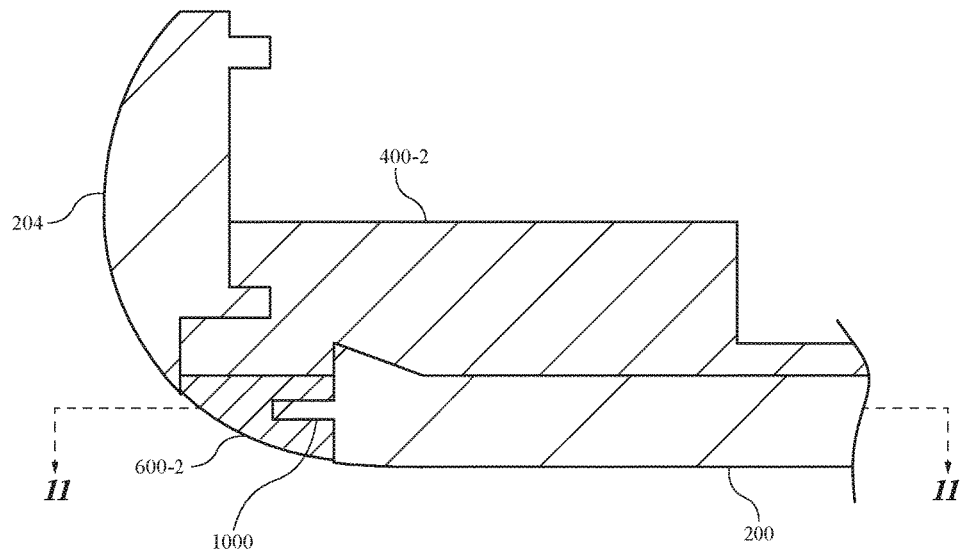
FIG. 10 shows a partial cross-sectional view of an embodiment of the electronic device housing of FIG. 4 taken along line 10-10 in FIG. 6, showing an interlock feature that includes a protrusion.

FIG. 10 is a partial cross-sectional view of the housing 104 taken along line 10-10 in FIG. 6, illustrating other examples of interlock features that mechanically engage the second molded element 600-2 to the housing 104. The body portion 200 includes a protrusion 1000 that extends away from a surface of the body portion 200 and into a cavity in which the second molded element 600-2 is disposed. During forming of the second molded element 600-2, the material of the second molded element 600-2 flows around the protrusion 1000. When the material hardens, the second molded element 600-2 mechanically engages the second molded element 600-2. In particular, the second molded element 600-2 is prevented from moving at least vertically with respect to the body portion 200 (as oriented in FIG. 10). Accordingly, the second molded element 600-2 is retained to the housing 104 via the protrusion 1000. The protrusion 1000 may have any appropriate shape and/or cross-section, such as a circular, square, rectangular, or triangular cross-section, or any other appropriate shape or cross section.

Figure 11:
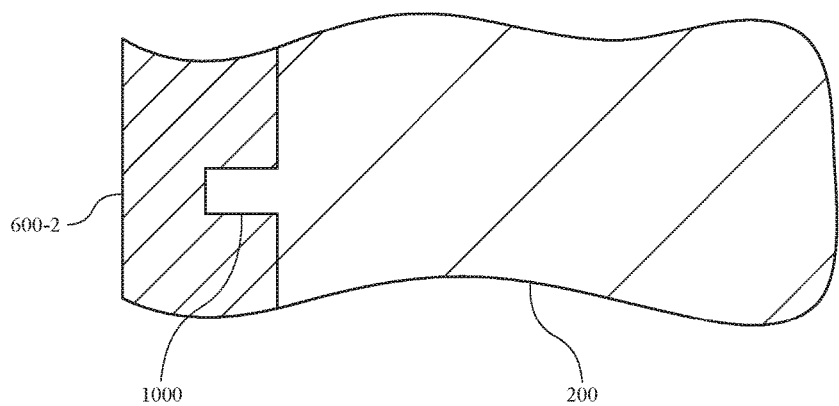
FIG. 11 shows a partial cross-sectional view of the embodiment of the electronic device housing of FIG. 10 taken along line 11-11 in FIG. 10.

FIG. 11 is a partial cross-sectional view of the housing 104 taken along line 11-11 in FIG. 10. In the embodiment shown, the protrusion 1000 is solid. In other embodiments, the protrusion may include one or more through-holes (or other cavities, recesses, or the like) that provide additional mechanical engagement between the body portion 200 and the second molded element 600-2.

Figure 12:
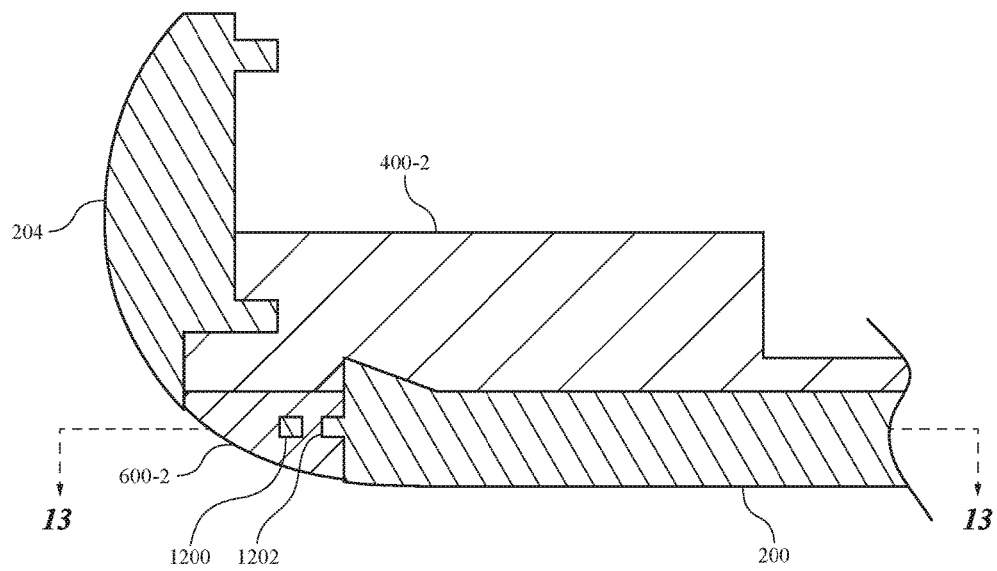
FIG. 12 shows a partial cross-sectional view of another embodiment of the electronic device housing of FIG. 4 taken along line 10-10 in FIG. 6, showing an interlock feature that includes a protrusion with a through-hole.
Figure 13:
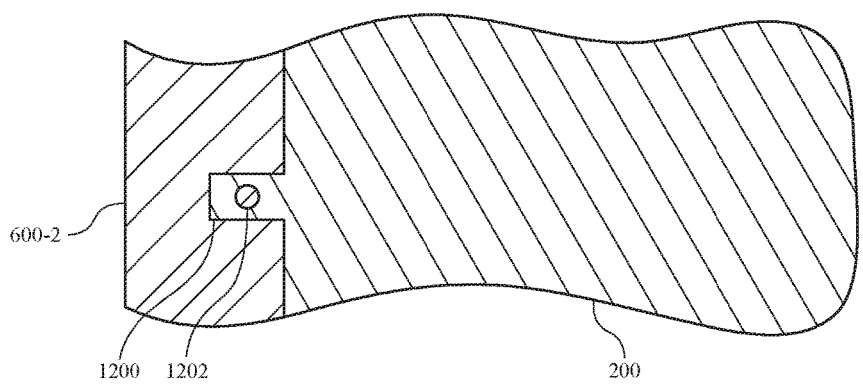
FIG. 13 shows a partial cross-sectional view of the embodiment of the electronic device housing of FIG. 12 taken along line 13-13 in FIG. 12.

FIG. 12 is a partial cross-sectional view of the housing 104 taken along line 10-10 in FIG. 6, illustrating an embodiment of the housing 104 where a protrusion 1200 includes a through-hole 1202 into which part of the second molded element 600-2 is disposed. In particular, material may flow into the through-hole 1202 during the forming of the second molded element 600-2. FIG. 13 is a partial cross-sectional view of the housing 104 taken along line 13-13 in FIG. 12, showing another view of the protrusion 1200 and the through-hole 1202. The additional mechanical engagement provided by the through-hole 1202 may increase the security of the coupling between the second molded element 600-2 and the body portion 200. For example, while the protrusion 1000 (FIG. 10) may primarily prevent or limit vertical motion of the second molded element 600-2 (as oriented in FIG. 12), the protrusion 1200 may prevent or limit both vertical and horizontal motion of the second molded element 600-2 with respect to the body portion 200.

Figure 14:
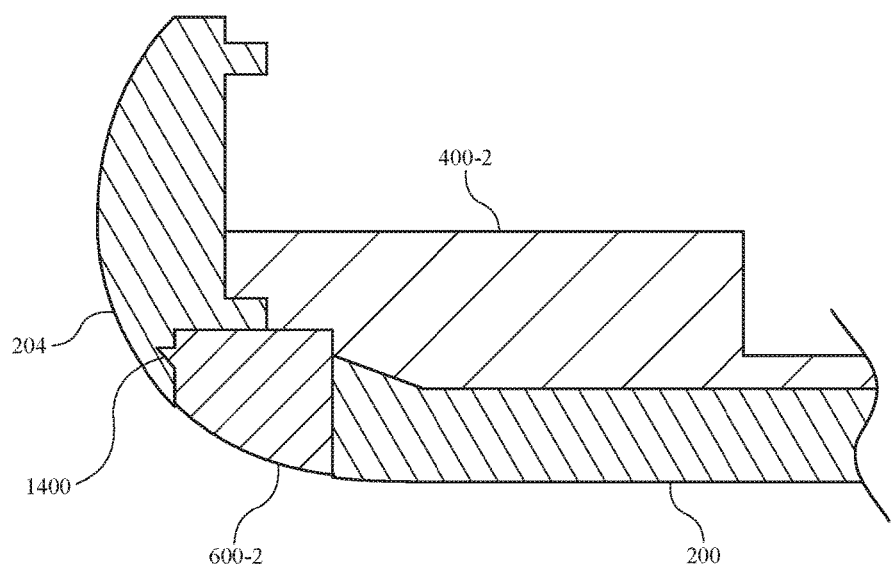
FIG. 14 shows a partial cross-sectional view of yet another embodiment of the electronic device housing of FIG. 4 taken along line 10-10 in FIG. 6, showing an interlock feature that includes a recess.

FIG. 14 is a partial cross-sectional view of another embodiment of the housing 104 taken along line 10-10 in FIG. 6, illustrating another example of an interlock feature with which the second molded element 600-2 engages to couple the second molded element 600-2 to the housing 104. In the illustrated embodiment, the bottom portion 204 includes a recess 1400 into which a portion of the second molded element 600-2 protrudes. In particular, the material of the second molded element 600-2 may flow into the recess 1400 during forming of the second molded element 600-2, and then harden to form a secure mechanical engagement with the recess 1400.

The recess 1400 may have any appropriate shape, and may be configured to retain the second molded element 600-2 in the gap by preventing the second molded element 600-2 from moving vertically with respect to the housing 104 (as oriented in FIG. 14). The recess 1400 may be any appropriate length along the bottom portion 204. For example, the recess 1400 may have similar length and height dimensions (where height is vertical and length is into/out of the page), or it may have a channel-shape where the length is longer than the height. In some cases, the recess 1400 may form a channel that extends along substantially an entire surface of the bottom portion 204.

The recess 1400 may be formed in any appropriate manner. For example, the recess 1400 may be part of the bottom portion 204 as-cast or as-molded, without requiring additional post-processing steps to form the recess 1400. Alternatively, the recess 1400 may be formed into the bottom portion 204 by drilling, milling, machining, laser ablating, or any other appropriate process.

Figure 15:
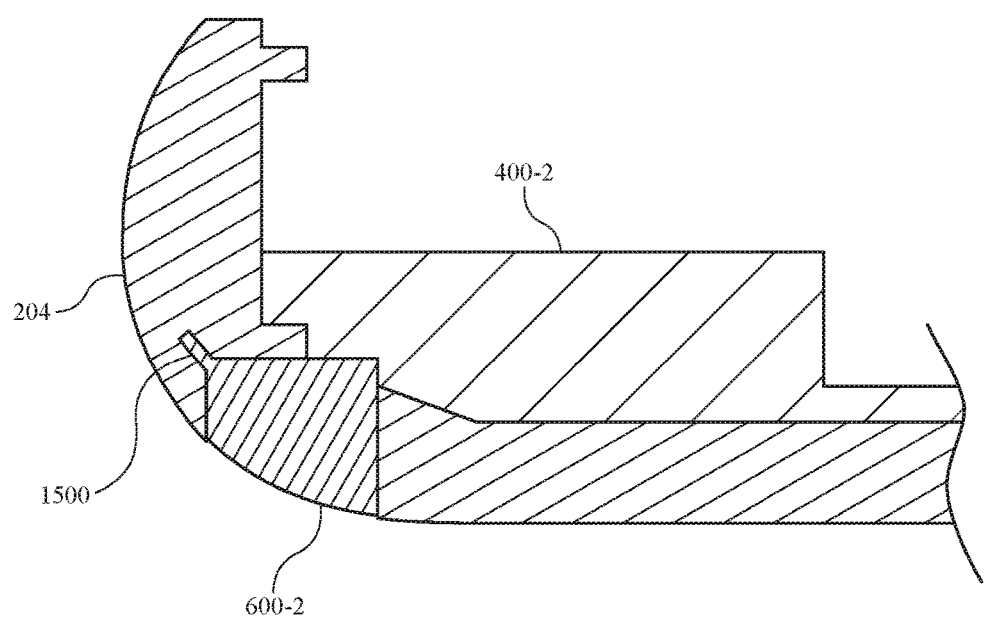
FIG. 15 shows a partial cross-sectional view of yet another embodiment of the electronic device housing of FIG. 4 taken along line 10-10 in FIG. 6, showing an interlock feature that includes a slot.

FIG. 15 is a partial cross-sectional view of another embodiment of the housing 104 taken along line 10-10 in FIG. 6, illustrating an example of another interlock feature with which the second molded element 600-2 may engage to couple the second molded element 600-2 to the housing 104. In FIG. 15, the bottom portion 204 includes a slot 1500 into which a portion of the second molded element 600-2 protrudes. In particular, the material of the second molded element 600-2 may flow into the slot 1500 during forming of the second molded element 600-2, and then harden within the slot to mechanically engage the second molded element 600-2 to the bottom portion 204. The slot 1500 may have any appropriate shape, and functions similar to the recess 1400 to retain the second molded element 600-2 in the gap between the housing components. Moreover, the slot 1500 may be formed in any appropriate way and using any appropriate technique, such as by molding or casting the bottom portion 204 to include the slot 1500, or forming the slot 1500 by milling, machining, laser ablating, grinding, or any other appropriate process.

Figure 16A:
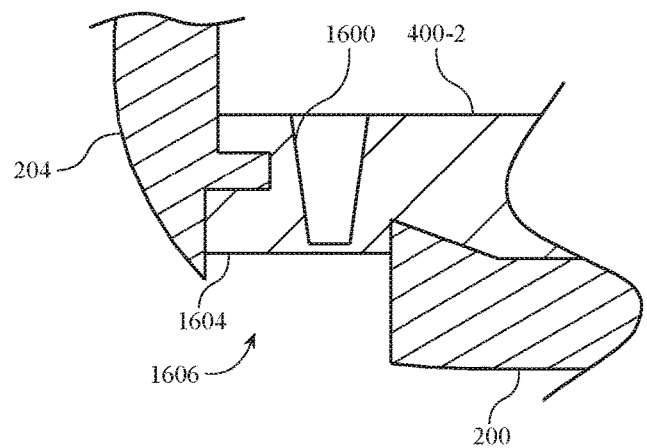
FIGS. 16A-16C show partial cross-sectional views of yet another embodiment of the electronic device housing of FIG. 4 taken along line 10-10 in FIG. 6, showing an interlock feature that includes a tapered through-hole.
Figure 16B:
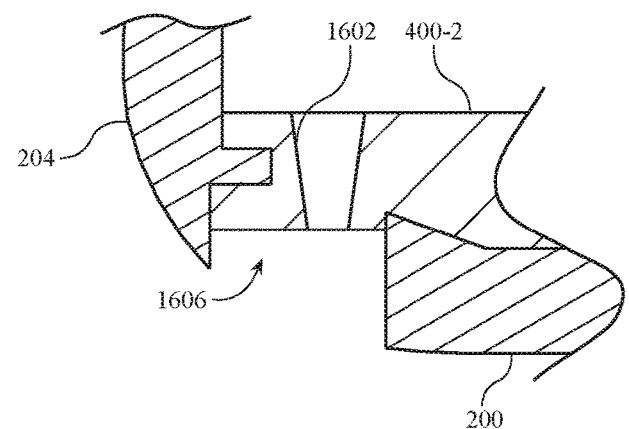
Figure 16C:
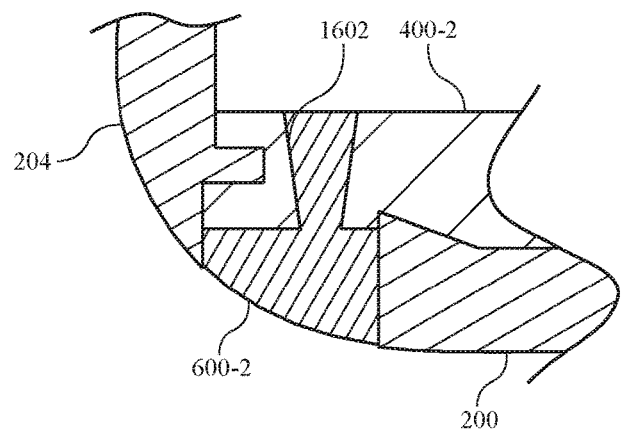

FIGS. 16A-16C are partial cross-sectional views of another embodiment of the housing 104 taken along line 10-10 in FIG. 6, illustrating an example of an interlock feature with which the second molded element 600-2 may engage to couple the second molded element 600-2 to the first molded element 400-2. In the illustrated embodiment, the second molded element 600-2 is retained to the housing 104 at least partially via a mechanical interlock with the first molded element 400-2. A mechanical interlock between the second molded element 600-2 and the first molded element 400-2 may be used instead of or in addition to mechanical interlocks between the second molded element 600-2 and the bottom portion 204 and/or the body portion 200 of the housing 104 (e.g. such as those discussed above with respect to FIGS. 10-15).

With reference to FIG. 16C, the first molded element 400-2 includes a tapered through-hole 1602 into which material of the second molded element 600-2 flows during forming of the second molded element 600-2. Once the material hardens, the tapered profile of the through-hole 1602 holds the second molded element 600-2 captive to the first molded element 400-2, and thus retains the second molded element 600-2 to the housing 104.

FIGS. 16A-16B illustrate stages of an example manufacturing process for forming the interlock shown in FIG. 16C. In FIG. 16A, the first molded element 400-2 is formed between the bottom portion 204 and the body portion 200. Forming the first molded element 400-2 may include flowing the material into a gap between the bottom portion 204 and the body portion 200. Prior to flowing the material into the gap, a removable insert may be placed into a region where the through-hole 1602 is to be located. When the material is flowed into the gap, it flows around the removable insert. Once the material has at least partially hardened or cured, the removable insert may be removed, forming a blind hole 1600 in the first molded element 400-2, as shown in FIG. 16A. The removable insert may have a draft angle that facilitates removal of the insert from the first molded element 400-2. This same draft angle forms the tapered profile of the through-hole 1602 that retains the material of the second molded element 600-2 to the first molded element 400-2.

A portion 1604 of the first molded element 400-2 at the blind end of the hole 1600 is then removed in order to create the through-hole 1602. Removing this material may also create or deepen a recess 1606 in the exterior surface of the housing 104 into which the second molded element 600-2 is formed. The material may be removed using machining, grinding, abrasive blasting (e.g., sand blasting), laser ablation, laser cutting, or the like. FIG. 16B illustrates the first molded element 400-2 after the portion 1604 has been removed.

Once the material is removed to form the through-hole 1602 and the recess 1606, the material forming the second molded element 600-2 may be introduced into the recess 1606 between the bottom portion 204 and the body portion 200 such that the material flows at least partially into the through-hole 1602. Once the material of the second molded element 600-2 hardens, the mechanical engagement between the tapered walls of the through-hole 1602 and the corresponding tapered surfaces of the second molded element 600-2 retains the second molded element 600-2 to the first molded element 400-2 and within the recess 1606.

The second molded element 600-2 may be molded proud of the body portion 200 and the bottom portion 204. Accordingly, material may be removed from the second molded element 600-2 to form a substantially uninterrupted, seamless, and/or smooth transition between the second molded element and neighboring exterior surfaces of the housing 104, for example, by grinding, machining, polishing, sanding, abrasive blasting, or laser ablating the second molded element 600-2. In some locations of the housing 104, the second molded element 600-2 and one or more nearby surfaces of the housing 104 form a substantially coplanar exterior surface of the housing 104. For example, in the area 214 in FIG. 2, the second panel 212, the joint structure 206-2 (which may include the second molded element 600-2), and the body portion 200 may be substantially coplanar. Moreover, the seams between the components in this area (and indeed between any of the joint structures 206 and adjacent housing portions) may lack gaps, grooves, or other surface discontinuities or irregularities, such that the exterior surface of the housing 104 is a continuous and/or smooth surface.

Figure 17A:
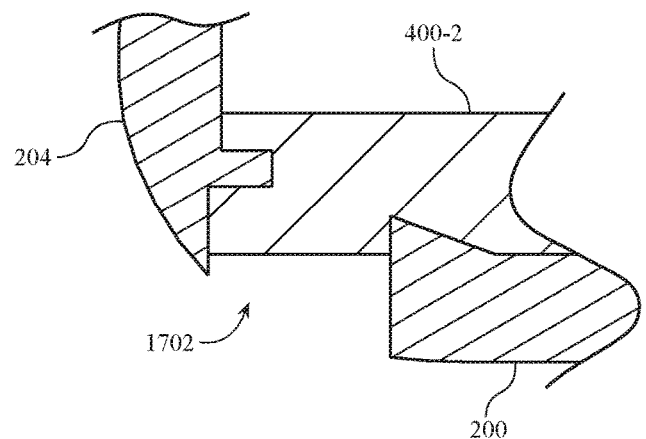
FIGS. 17A-17C show partial cross-sectional views of yet another embodiment of the electronic device housing of FIG. 4 taken along line 10-10 in FIG. 6, showing an interlock feature that includes a threaded hole.
Figure 17B:
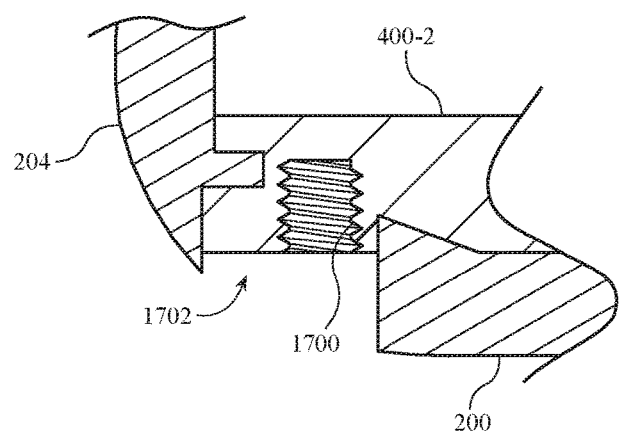
Figure 17C:
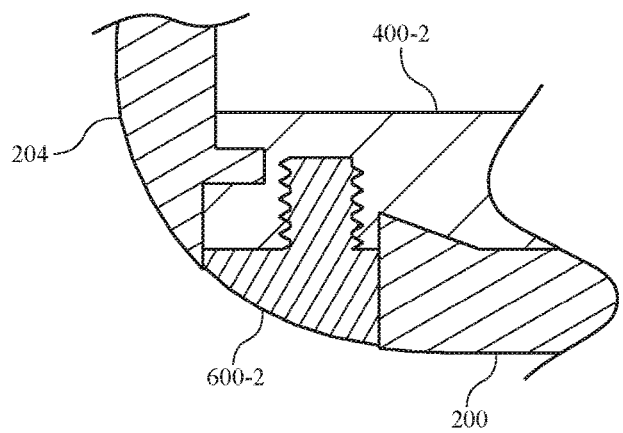

FIGS. 17A-17C are partial cross-sectional views of another embodiment of the housing 104 taken along line 10-10 in FIG. 6, illustrating another example of an interlock feature with which the second molded element 600-2 may engage to couple the second molded element 600-2 to the first molded element 400-2. In the illustrated embodiment, the second molded element 600-2 is retained to the housing 104 at least partially with a threaded interlock feature 1700 in the first molded element 400-2 (FIG. 17B). The threaded interlock in FIGS. 17A-17C may replace or supplement mechanical interlocks between the second molded element 600-2 and the housing 104 (e.g., such as those described with respect to FIGS. 10-15).

With reference to FIG. 17B, the first molded element 400-2 includes a threaded hole 1700 into which material of the second molded element 600-2 flows during forming of the second molded element 600-2. Once the material hardens, the threads of the threaded hole 1700 engage the material of the second molded element 600-2, thereby retaining the second molded element 600-2 to the first molded element 400-2 and, therefore, the housing 104. While FIGS. 17B-17C show a threaded hole 1700, a hole may include interlock features other than threads, such as grooves, splines, undercuts, recesses, cavities, protrusions, or the like.

FIGS. 17A-17B illustrate stages of an example manufacturing process for forming the threaded interlock shown in FIG. 17C. In FIG. 17A, the first molded element 400-2 has been formed between the bottom portion 204 and the body portion 200. Forming the first molded element 400-2 may include flowing the material against or around interlock features of the bottom portion 204, the body portion 200, and/or other portions of the housing 104 to retain the first molded element 400-2 to the housing 104, as described herein.

A threaded hole 1700 is then formed in the first molded element 400-2. The threaded hole 1700 may be a blind hole (as shown), or it may be a through-hole. The threaded hole 1700 may be formed in any appropriate way. For example, a smooth-bore hole may be formed by drilling, milling, chemical etching, laser ablating, or the like. Threads may then be cut into the sidewall of the smooth hole with a tapping tool or other appropriate tool or process.

Instead of forming the threaded hole 1700 after forming the first molded element 400-2, the first molded element 400-2 may include the threaded hole 1700 in its as-formed shape. For example, a threaded insert may be placed into the region between the bottom portion 204 and the body portion 200 where the threaded hole 1700 is to be located. The material forming the first molded element 400-2 is then flowed into the space and around the threaded insert. Once the material has at least partially hardened or cured, the threaded insert may be removed by unthreading the insert from the first molded element 400-2, leaving the threaded hole 1700 in the first molded element 400-2.

Once the threaded hole 1700 is formed, the material forming the second molded element 600-2 may be introduced into a recess 1702 between the bottom portion 204 and the body portion 200 such that the material flows at least partially into the threaded hole 1700. Once the material hardens, the mechanical engagement between the threads of the threaded hole 1700 and the corresponding threaded surfaces of the second molded element 600-2 retain the second molded element 600-2 to the first molded element 400-2 and within the recess 1702. In some cases, the second molded element 600-2 is molded proud of neighboring exterior surfaces of the body portion 200 and the bottom portion 204 and is further processed to form a substantially uninterrupted, seamless, and/or smooth transition between the second molded element 600-2 and neighboring exterior surfaces of the housing 104, as described above.

Figure 17D:
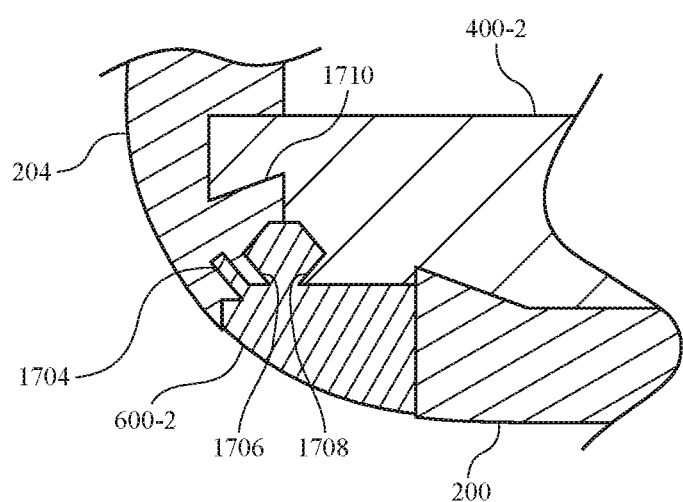
FIG. 17D shows a partial cross-sectional view of yet another embodiment of the electronic device housing of FIG. 4 taken along line 10-10 in FIG. 6, showing multiple interlock features.

FIG. 17D is a partial cross-sectional view of another embodiment of the housing 104 taken along line 10-10 in FIG. 6, illustrating a combination of interlock features that together couple the second molded element 600-2 to the housing 104 (e.g., the bottom portion 204), couple the second molded element 600-2 to the first molded element 400-2, and couple the second molded element 600-2 to the housing 104 (e.g., the bottom portion 204). In particular, the first molded element 400-2 engages an undercut 1710 in the bottom portion 204 of the housing 104. The undercut 1710 prevents the first molded element 400-2 from horizontally separating from the bottom portion 204 (with respect to the orientation shown in FIG. 17D), and also thereby couples the bottom portion 204 to the body portion 200.

The second molded element 600-2 is molded into a cavity that is formed partially by the first molded element 400-2 (e.g., the wall 1708) and partially by the bottom portion 204 of the housing 104 (e.g., the wall 1706). Thus, the interlock feature is formed by both the housing 104 and the first molded element 400-2. The angle of the walls 1706, 1708 prevent the second molded element 600-2 from vertically separating from the first molded element 400-2 (with respect to the orientation shown in FIG. 17D). The walls 1706, 1708 may be formed in any appropriate manner. For example, they may be machined into the bottom portion 204 and the first molded element 400-2 after the first molded element 400-2 is molded into the gap between the bottom portion 204 and the body portion 200.

The geometry of the walls 1706, 1708 as shown in FIG. 17D are merely examples, and any other geometries or interlocks that are formed by both the first molded element 400-2 and the housing 104 may be used. For example, instead of the angled walls 1706, 1708, the interlock may be a threaded hole that is formed partly in the bottom portion 204 of the housing 104, and partly in the first molded element 400-2. For example, after the first molded element 400-2 is molded, a hole may be drilled and threaded at an interface between the first molded element 400-2 and the bottom portion 204 of the housing 104. The resulting threaded hole is defined in part by the bottom portion 204 and in part by the first molded element 400-2.

The second molded element 600-2 may also be coupled to the housing 104 via an interlock feature formed in the housing 104 alone. For example, the bottom portion 204 of the housing 104 includes a slot 1704 into which a portion of the second molded element 600-2 protrudes. In particular, the material of the second molded element 600-2 may flow into the slot 1704 during forming of the second molded element 600-2, and then harden within the slot to mechanically engage the second molded element 600-2 to the bottom portion 204.

While FIG. 17D illustrates a combination of interlock features, it is merely one example combination of features that may be used. For example, the slot 1704 may be replaced (or supplemented) by any other interlock feature that is formed in the housing 104 to couple to the second molded element 600-2 (e.g., the recess 1400 in FIG. 14). Similarly, the undercut 1710 may be replaced (or supplemented) by any other interlock feature that is configured to couple the first molded element 400-2 to the housing 104 (e.g., the boss 408 in FIGS. 4, 7). Moreover, any of the interlock structures shown in FIG. 17D may be used independently of any others.

Instead of or in addition to the interlocks described above for coupling the second molded element 600-2 to the first molded element 400-2, first and second molded elements may be coupled to one another by adhesion. For example, an adhesive may be applied to the first molded elements 400 (e.g., on the surfaces of the first molded elements that form the bottoms of the recesses 414) before the second molded elements 600 are molded into the recesses 414. Thus, the second molded elements 600 may adhere to the first molded elements 400 with the adhesive. As another example, a solvent may be applied to the first molded elements 400 to allow the second molded elements 600 to chemically bond directly to the first molded elements 400. As yet another example, the material of the second molded elements 600 may be configured to chemically attack the surface of the first molded elements 400 such that the materials of the first and second molded elements cure together to form a monolithic structure. As yet another example, the first molded elements 400 may be processed to form a rough or textured surface (e.g., by sanding, sand blasting, grinding, laser ablating, chemical etching, or the like) that facilitates adhesion between the first and second molded elements. Similarly, nano-molding technology may be used to form small (e.g., nano-scale or micro-scale) features on the surfaces of the first molded elements 400, to which the second molded elements 600 anchor when molded over the first molded elements 400. The foregoing techniques may also be used to facilitate adhesion between portions of the housing 104

(e.g., the top and bottom portions 202, 204 and the body portion 200) and the first and second molded elements.

The interlock features described above, as well as their locations on the various housing components and joint structures, are examples. Embodiments may use various different combinations of the interlock features described, may place the interlock features in locations other than those described or depicted herein, and/or may use multiple instances of (or omit) any of the interlock features described. For example, interlock features described as being part of the top portion 202 may instead or additionally be part of the body portion 200. Moreover, interlock features that are described above for coupling a second molded element 600 to a first molded element 400 may instead or in addition be used to couple a first molded element 400 to the housing 104. Such variations are within the scope of the ideas presented herein.

FIGS. 7-17D, described above, illustrate various interlock features that may be used to couple joint structures to a housing of an electronic device, and to couple various portions of a housing together to form a complete housing structure. Joint structures may also include features that help strengthen or buttress more delicate or more critical portions of the joint structures, and to help increase the overall durability and structural integrity of the housing.

Figure 18:
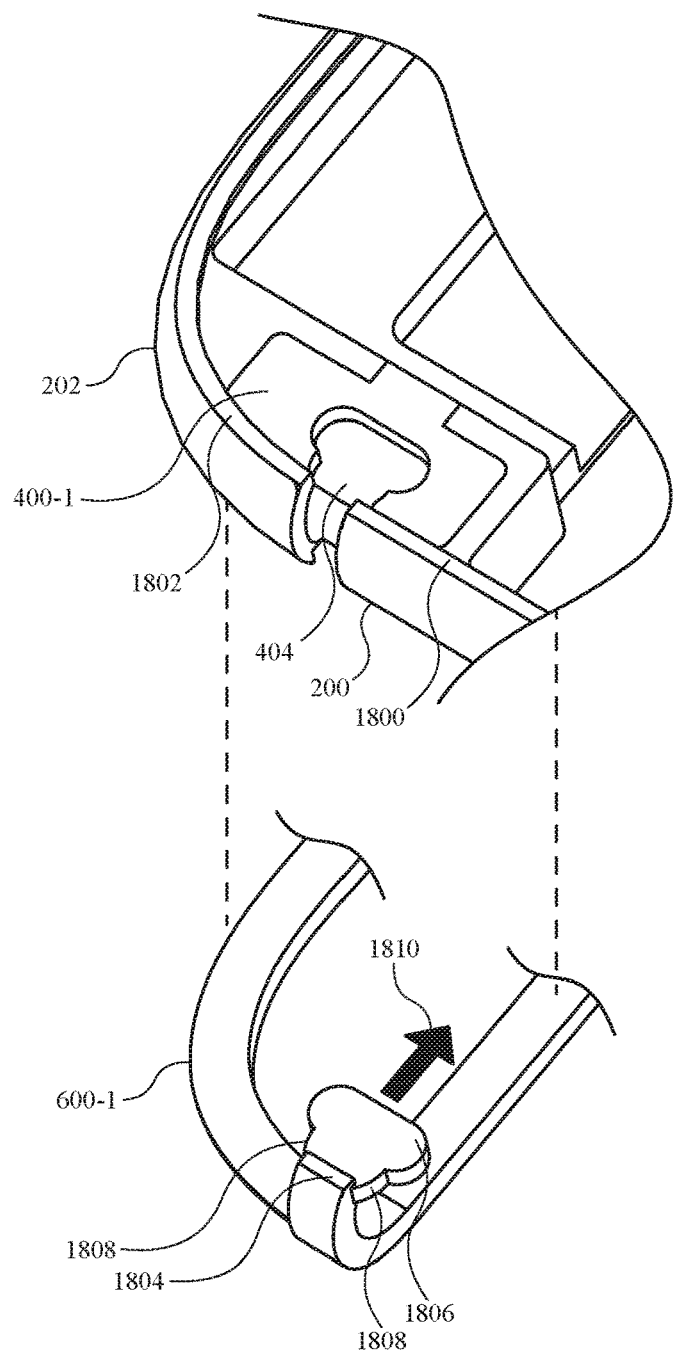
FIGS. 18-20C show partial exploded views of the electronic device housing of FIG. 4, showing various embodiments of a guide structure for a molded element.

FIG. 18 is a partial exploded view of the housing 104 showing the joint structure 206-1 where the second molded element 600-1 is removed from the first molded element 400-1. The body portion 200 and the top portion 202 each include a flange 1800, 1802, respectively. The flanges of the housing portions define a frame that is adapted to receive a transparent cover (e.g., a glass or plastic component, or an assembly including multiple layers of glass, plastic, coatings, or the like) of the device 100. The second molded element 600-1 includes a tooth 1804 or other member or protrusion that extends past a ledge 1806 of the second molded element and bridges a gap between the flanges 1800 and 1802, thus forming a portion of the frame. The second molded element 600-1 also includes a guide structure (or support structure) 1808 that supports and/or strengthens the tooth 1804 (or other member or protrusion), and is configured to bias the second molded element 600-1 towards an interior of the housing 104 to prevent or reduce damage to the second molded element 600-1 in the event of an impact.

In FIG. 18, the guide structure 1808 protrudes from a side of the second molded element 600-1 (or both sides, as shown). The cavity 404 (FIG. 4) in first molded element 400-1 includes a corresponding shape or feature into which the guide structure 1808 is disposed when the first and second molded elements are coupled together. In particular, because the second molded element 600-1 is molded into the gap between the housing components and into the cavity 404, the shape of the recess and the cavity 404 will determine the shape of the second molded element 600-1, including the guide structure 1808. Thus, the guide structure 1808 (and indeed any of the guide structures described herein) may be formed by the process of molding the second molded element 600-1 into the gap between the housing components and against the first molded element 400-1.

By including the guide structure 1808 near the tooth 1804, the tooth 1804 (or other member or protrusion) may be stronger and more resistant to breakage than if no guide structure were included (e.g., if the portion of the second molded element 600-1 that extends from the tooth 1804 to the ledge 1806 was the same width as the tooth 1804). For example, when the device 100 is dropped or otherwise subjected to an impact, the top portion 202 and the body portion 200 may be pressed together, thus narrowing the gap between the components and resulting in the joint structure 206-1 being compressed. This narrowing of the gap and resulting compression on the joint structure 206-1 may cause the tooth 1804 to crack, break, or otherwise become damaged. The addition of the guide structure 1808 near the tooth 1804 increases the strength of the second molded element 600-1 in the vicinity of the tooth 1804, and thus may reduce the likelihood of or prevent damage to the tooth 1804 in the event of a drop or other potentially damaging impact.

Also, the guide structure 1808 may act as a guide such that when the second molded element 600-1 is compressed between the housing components as a result of the narrowing of the gap between the housing components, the tooth 1804 (or other member or protrusion) is drawn or biased towards the interior of the housing 104, as shown by arrow 1810, rather than forced outwards, towards the exterior of the housing 104. In particular, if the tooth 1804 is forced outwards, it may be more likely to break than if it is drawn towards the interior of the housing 104. Thus, when the housing portions are forced together, the sides of the cavity 404 of the first molded element 400-1 will press against the guide structure 1808. Because the guide structure 1808 is wider at the end near the interior of the housing 104, the pressure against the guide structure 1808 will result in the tooth 1804 (and surrounding areas) being forced toward the housing 104 in the direction of the arrow 1810.

It is not necessary that the tooth 1804 actually moves or deflects toward the interior of the housing 104 for the guide structure 1808 to be effective. Indeed, as the second molded element 600-1 may be rigidly held in the gap between the housing components, it may be unable to move freely. Nevertheless, the shape of the guide structure 1808 translates a compression force into an inward force rather than an outward force, the latter being more likely to result in damage to the tooth 1804.

Figure 19:
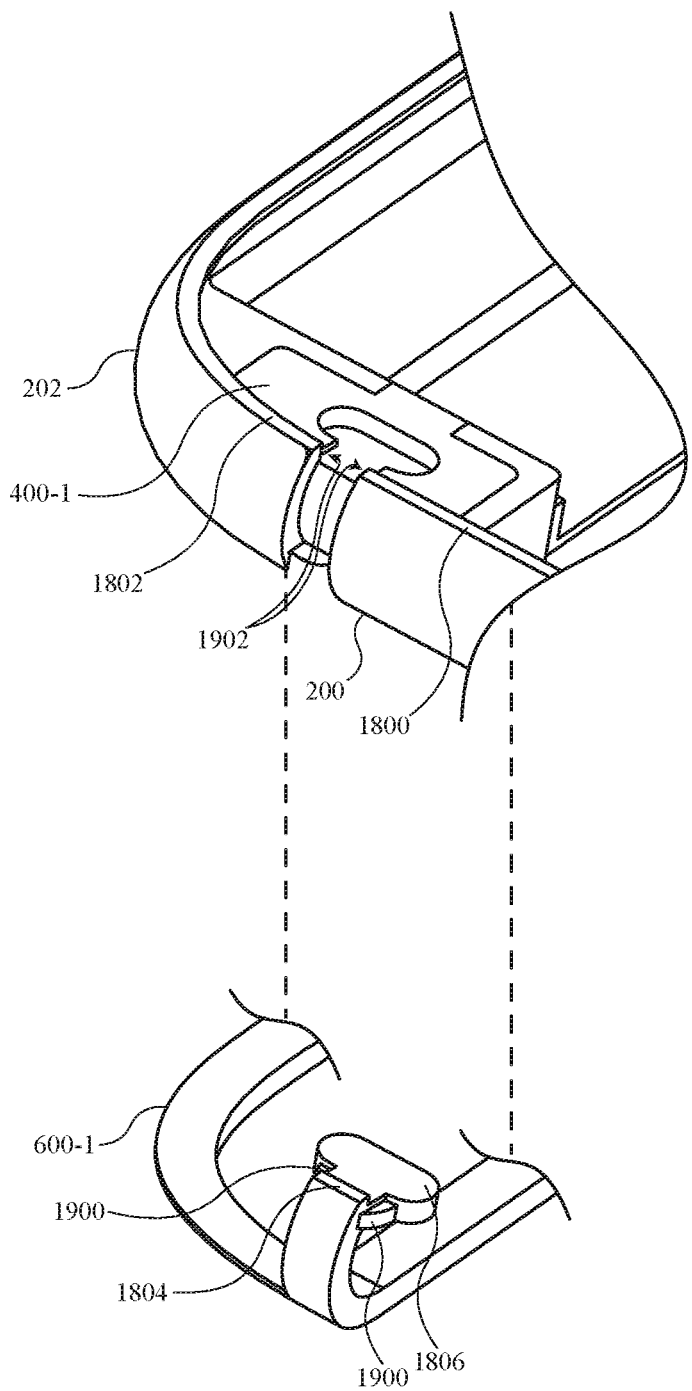

FIG. 19 is a partial exploded view of the housing 104 showing the joint structure 206-1 where the second molded element 600-1 is removed from the first molded element 400-1. A guide structure (or support structure) 1900 protrudes from a side of the second molded element 600-1. The guide structure 1900 has a rounded shape that is similar to the guide structure 1808, but does not extend to a top surface of the ledge 1806. The guide structure 1900 strengthens the tooth 1804 and tends to draw the tooth 1804 towards the interior of the housing 104, as described with respect to the guide structure 1808.

The first molded element 400-1 includes a pocket 1902 in which the guide structure 1900 is disposed when the first and second molded elements are coupled together to form the joint structure 206-1. The pocket 1902 includes an undercut in the material of the first molded element 400-1, and communicates with the cavity 404. The pocket 1902 may be molded into the first molded element 400-1 during forming of the first molded element 400-1, or it may be formed by machining, grinding, laser ablating, or otherwise removing material from the first molded element 400-1 after it is formed. The guide structure 1900 may be formed during the molding of the second molded element 600-1 by introducing material into the gap between the housing portions and into the cavity 404 and the pocket 1902. The cured material forms the second molded element 600-1, and the guide structure 1900 mechanically engages the pocket 1902.

Figure 20A:
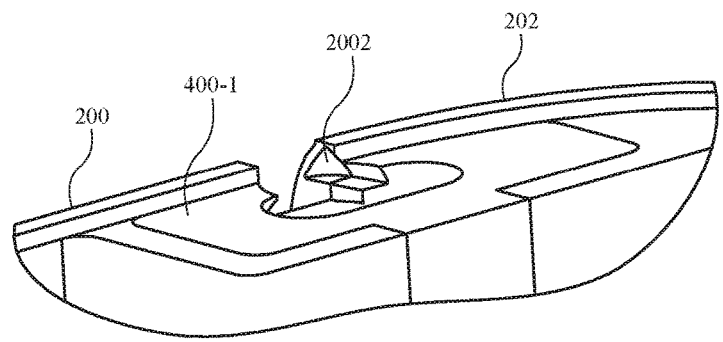
Figure 20B:
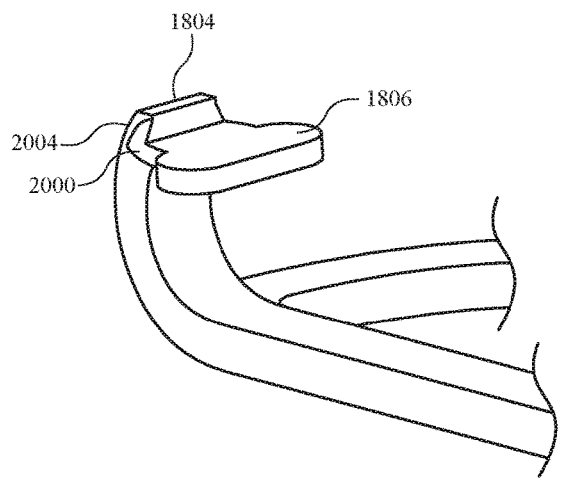
Figure 20C:
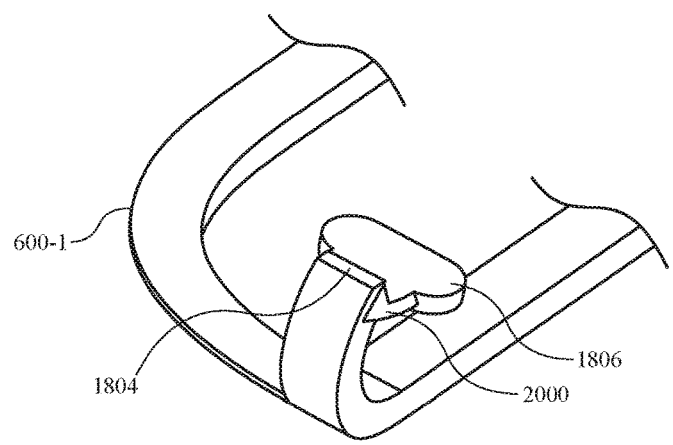

FIGS. 20A-20C illustrate another embodiment of a guide structure (or support structure) 2000 that protrudes from a side of the second molded element 600-1 to support the tooth 1804. The guide structure 2000 extends from a side of the tooth 1804 to a side of the ledge portion 1806, and is configured to be disposed in a pocket 2002 in the housing 104. The pocket 2002 may be formed from cavities in both the first molded element 400-1 and the housing 104 (e.g., the top portion 202 and/or the body portion 200). In particular, a portion of the pocket 2002 may be formed in the top portion 202 of the housing 104, and a second portion of the pocket 2002 may be formed in the first molded element 400-1. The first and second portions communicate with each other to form a single pocket 2002 in which the guide structure 2000 is formed. The pocket 2002 and the guide structure 2000 may form a rounded bevel shape. For example, an outer edge of the guide structure 2000 may extend along a rounded path from a curved member 2004 to the ledge portion 1806. Moreover, a top surface of the guide structure 2000 (as oriented in FIG. 20B) may extend away from the curved member 2004 and from a top surface of the ledge portion 1806 at an angle, while a bottom surface of the guide structure extends substantially parallel to a top surface of the ledge portion 1806.

The pocket 2002 may be formed by removing material from the housing portions and the first molded element 400-1 (e.g., by grinding, cutting, machining, or the like) after the first molded element 400-1 is formed. The guide structure 2000 may be formed during the molding of the second molded element 600-1 by introducing material into the gap between the housing portions and into the cavity 404 and the pocket 2002. The cured material forms the second molded element 600-1, and the guide structure 2000 mechanically engages the pocket 2002.

Figure 21A:
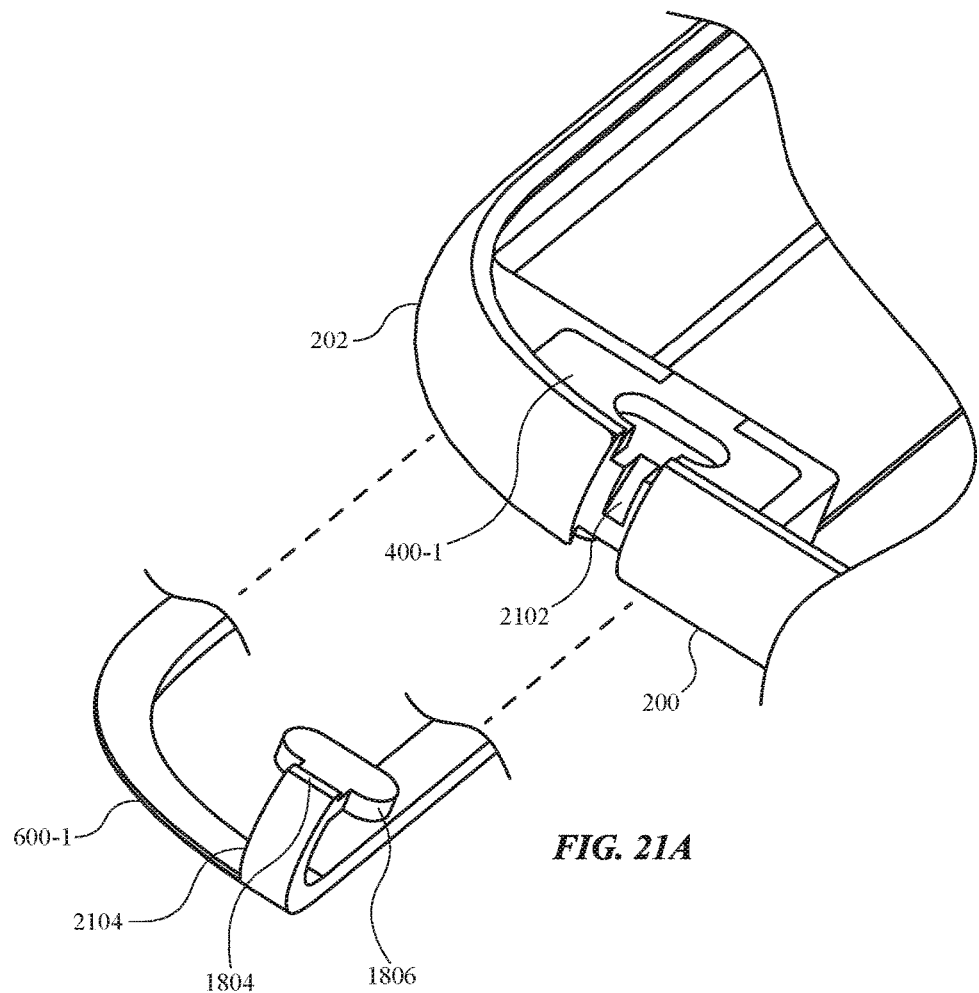
FIG. 21A shows a partial exploded view of the electronic device housing of FIG. 4, showing a molded element that includes an example gusset.
Figure 21B:
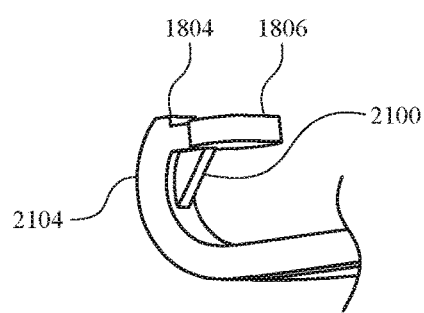
FIG. 21B shows a partial view of the molded element of FIG. 21A.

FIG. 21A is a partial exploded view of the housing 104 showing the joint structure 206-1 where the second molded element 600-1 is removed from the first molded element 400-1. FIG. 21B is a partial view of the second molded element 600-1 in which a gusset 2100 is disposed on an interior radius of a curved member 2104 of the second molded element 600-1. The gusset 2100 is configured to be disposed within a groove 2102 formed in the first molded element 400-1. The gusset 2100 may strengthen and/or support the curved member 2104 and the tooth 1804 by increasing the amount of material available to support stresses imparted on those portions of the second molded element 600-1. Moreover, the gusset 2100 may stiffen the curved member 2104 such that compression of the second molded element 600-1 (e.g., caused by dropping the device 100) does not result in damaging deflection of the curved member 2104 and/or the tooth 1804.

Like other features described herein, the groove 2102 may be molded directly into the first molded element 400-1, or formed after molding by removing material by grinding, milling, laser ablating, or the like. Moreover, the gusset 2100 may be formed by molding the material of the second molded element 600-1 into the groove 2102.

Figure 22A:
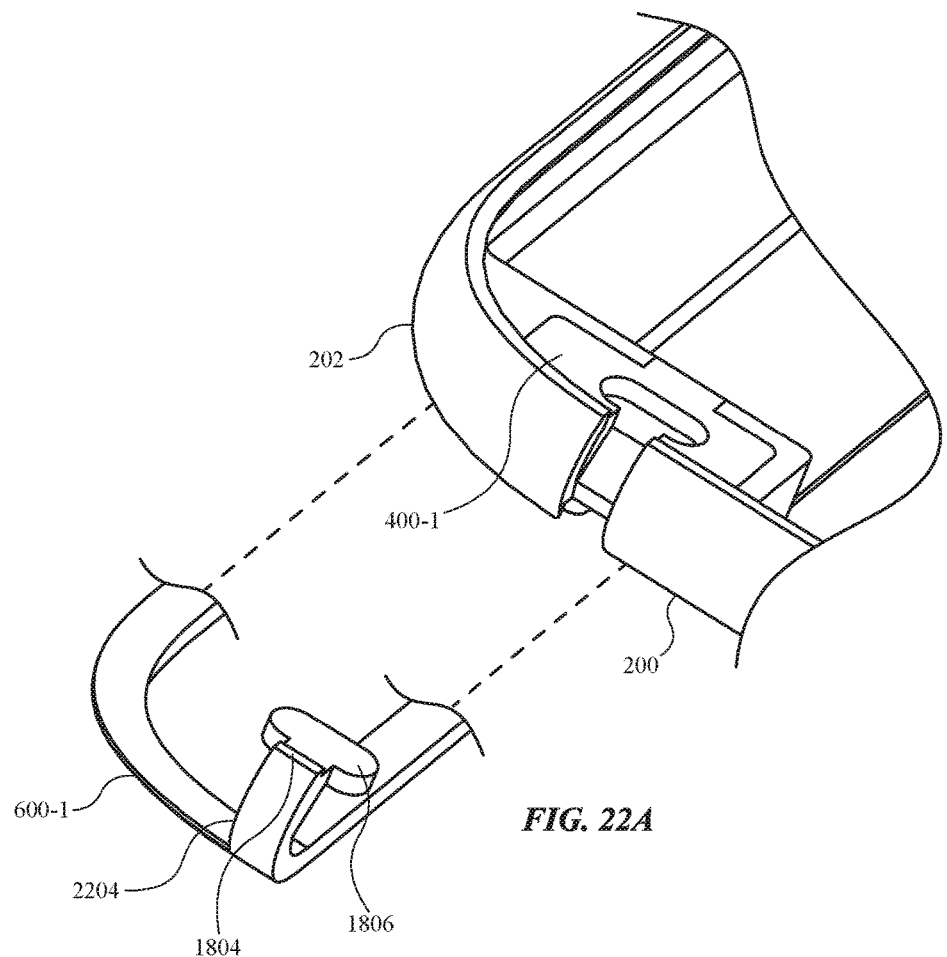
FIG. 22A shows a partial exploded view of the electronic device housing of FIG. 4, showing a molded element that includes another example gusset.
Figure 22B:
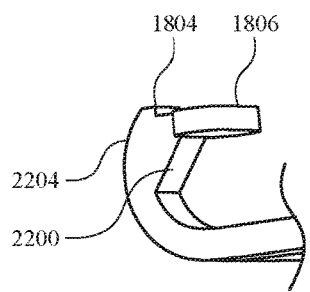
FIG. 22B shows a partial view of the molded element of FIG. 22A.

FIGS. 22A-22B illustrate another example of a gusset 2200 that may support a curved member 2204 of the second molded element 600-1. Whereas the gusset 2100 (FIGS. 21A-B) extends only part of the width of the curved member 2104, the gusset 2200 in FIG. 22B extends the full width of the curved member 2204.

Figure 23A:
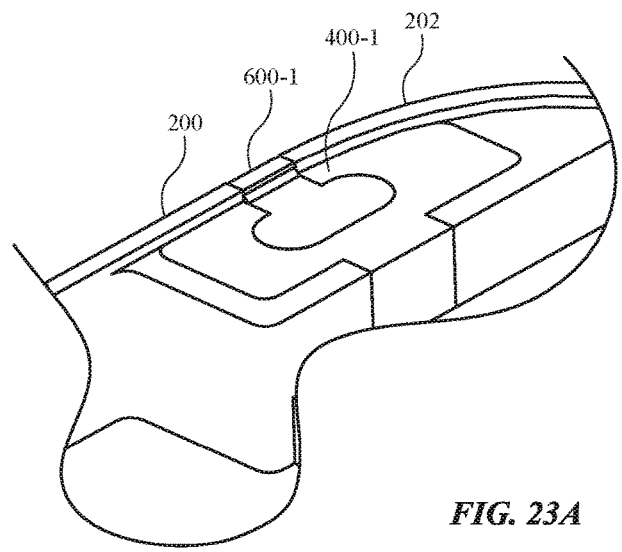
FIG. 23A shows a partial view of the electronic device housing of FIG. 4, showing a molded element with a chamfer.
Figure 23B:
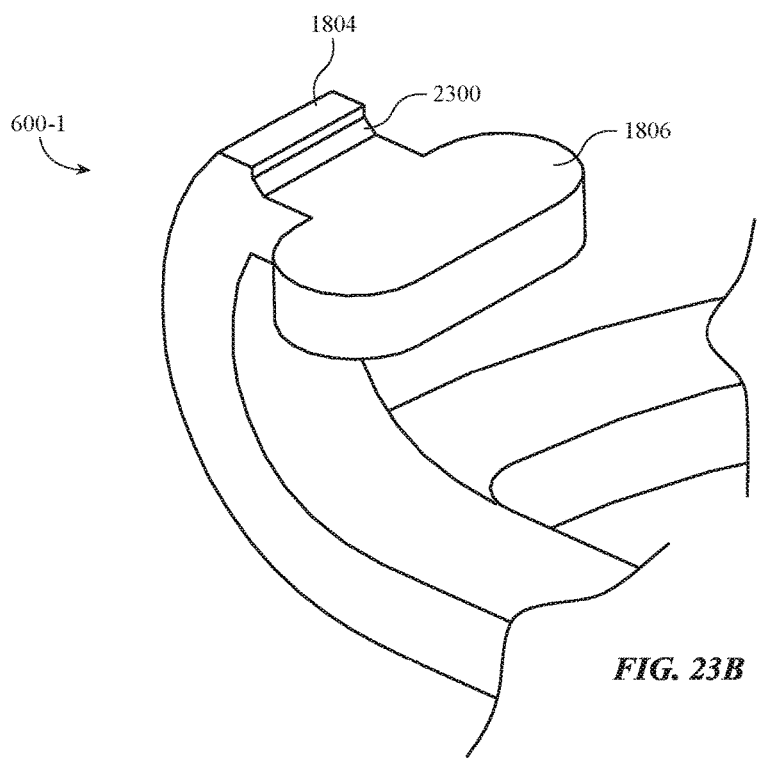
FIG. 23B shows a partial view of the molded element of FIG. 23A.

FIGS. 23A-23B illustrate an embodiment of the second molded element 600-1 that includes a chamfer 2300 at a joint between the tooth 1804 and the ledge portion 1806 of the second molded element 600-1. The chamfer 2300 extends from a side of a cantilevered part of the tooth 1804 to a surface of the ledge portion 1806. The chamfer 2300 decreases the amount of material that extends unsupported above the ledge portion 1806, and thus increases the strength and/or stiffness of the tooth 1804. Accordingly, the chamfer may prevent chipping or breaking of the tooth 1804 if the device 100 is dropped or otherwise subjected to potentially damaging forces.

Figure 24:
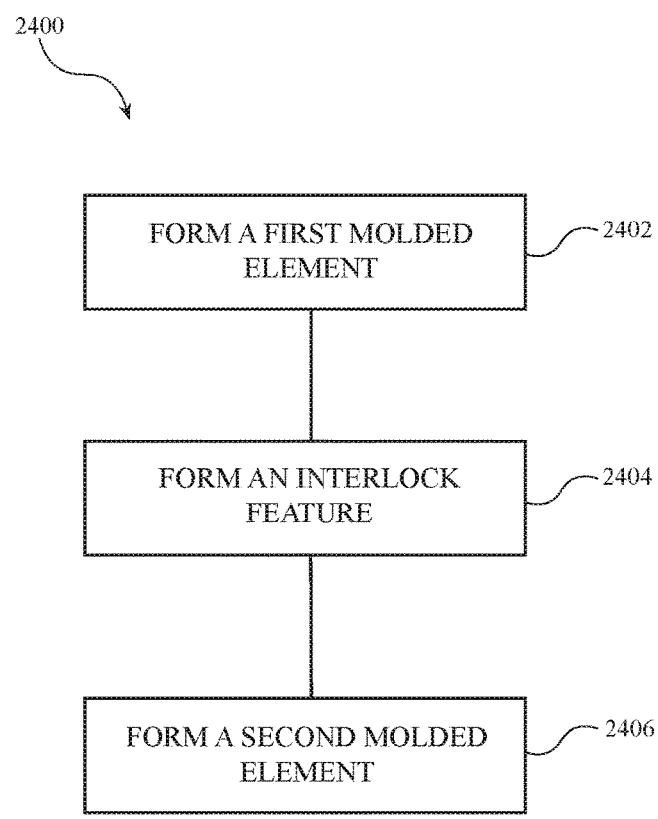
FIG. 24 is a flow chart of a method of forming a housing for an electronic device.

FIG. 24 depicts a flow chart of a method 2400 of forming a housing for an electronic device, such as the housing 104. At operation 2402, a first molded element is formed between a first housing component and a second housing component (each forming a portion of the housing) to couple the first and second housing components. For example, first and second housing components may be introduced into a mold that holds the housing components such that they are separated by a gap. A first material (e.g., nylon, polyether ether ketone, etc.) may then be introduced into the mold such that the material flows into the gap and against first and second interlock features of the first and second housing components, respectively. The material may then be cured or otherwise hardened to form a rigid component comprising the first and second housing components joined by the first molded element.

The mechanical engagement between the first molded element and the interlock features couples the first molded element to the first and second housing components, and thus couples the first and second housing components to each other. Example interlock features are discussed herein.

At operation 2404, an interlock feature is optionally formed in the first molded element. For example, a hole (e.g., a threaded hole or a tapered hole), recess, protrusion, or the like, may be formed in the first molded element after the first molded element is at least partially cured. The interlock feature may be formed by removing material (for example, by milling, grinding, drilling, threading, laser ablating, or the like) and/or by adding material (for example, by laser sintering, bonding, mechanical joining, or the like).

Alternatively or additionally, an interlock feature may be formed in the first molded element during molding of the first molded element. For example, the mold that holds the housing components may include protrusions, voids, or other features that will mold the interlock features into the first molded element when the first material is introduced into the mold.

At operation 2406, a second molded element is formed. For example, the second molded element may be formed by introducing a second material (e.g., nylon, polyether ether ketone, etc.) into the gap after the first molded element is formed and at least partially cured. Optionally, an adhesive may be applied to the first molded element prior to forming the second molded element (e.g., prior to introducing the second material into the gap and against the first molded element), such that the second molded element is bonded to the first molded element by the adhesive. The second material may completely fill the gap such that the outer surface of the second molded element and the housing (e.g., portions of the housing that are next to the second molded element) form a substantially continuous surface (e.g., they may be coplanar). The second material may then be cured or otherwise hardened.

If the first molded element includes an interlock feature for engaging the second molded element, forming the second molded element may include flowing the second material against the interlock in the first molded element to mechanically engage the second molded element to the first molded element.

While any methods disclosed herein have been described and shown with reference to particular operations performed in a particular order, these operations may be combined, sub-divided, or re-ordered to form equivalent methods without departing from the teachings of the present disclosure. Accordingly, unless specifically indicated herein, the order and grouping of the operations is not a limitation of the present disclosure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A housing for an electronic device, comprising:
a first component;
a second component separated from the first component by a gap;
a first molded element disposed at least partially within the gap and defining:
at least a portion of an interlock feature; and
a textured surface; and
a second molded element disposed at least partially within the gap and mechanically engaging the interlock feature and the textured surface, thereby retaining the second molded element to the first molded element; wherein
the first component, the second component, and the second molded element form a portion of an exterior surface of the housing.

2. The housing of claim 1, wherein the interlock feature mechanically couples the first component to the second component.

3. The housing of claim 2, wherein:
the interlock feature is a first interlock feature;
the first component defines a second interlock feature; and
the first molded element mechanically engages the second interlock feature to mechanically couple the first molded element to the first component.

4. The housing of claim 1, wherein the interlock feature is a protrusion formed in the first molded element.

5. The housing of claim 1, wherein the interlock feature is a recess formed in the first molded element.

6. The housing of claim 5, wherein:
the first molded element defines a first portion of the interlock feature; and
the first component defines a second portion of the interlock feature.

7. The housing of claim 1, wherein:
the interlock feature is a through-hole extending from a first surface of the first molded element to a second surface of the first molded element; and
the first surface of the first molded element is adjacent the second molded element.

8. The housing of claim 1, wherein:
the first component defines a first exterior surface of the housing;
the second component defines a second exterior surface of the housing;
the second molded element defines a third exterior surface of the housing; and
at least portions of the first, second, and third exterior surfaces of the housing form a substantially coplanar surface.

9. The housing of claim 1, wherein the first molded element has a higher strength than the second molded element.

10. The housing of claim 1, wherein the first component is an antenna.

11. A housing for an electronic device, comprising:
a first component;
a second component separated from the first component by a gap; and
a joint structure disposed at least partially within the gap;
wherein:
the first component and the second component comprise flanges defining first and second portions, respectively, of a frame adapted to receive a transparent cover;
a tooth of the joint structure extends past a ledge of the joint structure and forms a third portion of the frame; and
the joint structure includes a support structure that supports the tooth.

12. The housing of claim 11, wherein the support structure protrudes from a side of the joint structure.

13. The housing of claim 12, wherein the support structure extends from a side of the tooth to a side of the ledge.

14. The housing of claim 12, wherein the support structure is disposed in a pocket formed in one of the first or second components.

15. The housing of claim 12, wherein:
the joint structure is a first molded element;
the housing further comprises a second molded element disposed at least partially within the gap and comprising a pocket formed therein; and
the support structure is disposed in the pocket formed in the second molded element.

16. The housing of claim 15, wherein the support structure and the pocket are shaped such that a narrowing of the gap causes the tooth to be drawn toward the transparent cover.

17. The housing of claim 11, wherein the support structure comprises a chamfer extending from the tooth to the ledge.

18. The housing of claim 11, wherein the joint structure comprises:
a curved member; and
a gusset on an interior radius of the curved member.

19. A housing for an electronic device, comprising:
a first housing portion forming a first portion of an exterior surface of the housing;
a second housing portion separated from the first housing portion by a gap and forming a second portion of the exterior surface of the housing; and
a joint structure disposed in the gap and comprising:
a protrusion that defines a portion of a frame configured to receive a transparent cover; and
a guide structure extending from a side of the protrusion to a lower portion of the protrusion and configured to bias at least a portion of the joint structure toward an interior of the housing in response to a narrowing of the gap.

20. The housing of claim 19, wherein the guide structure engages a complementary recess in one of the first or the second housing portions to bias the portion of the joint structure toward the interior of the housing in response to the narrowing of the gap.

21. The housing of claim 19, wherein an outer edge of the guide structure is rounded.

22. The housing of claim 19, wherein the narrowing of the gap is caused by the housing impacting a surface.

* * * * *